US012583512B2

(12) United States Patent
Endo et al.

(10) Patent No.: US 12,583,512 B2
(45) Date of Patent: Mar. 24, 2026

(54) CONTROL DEVICE, ELECTRIC POWER STEERING DEVICE, AND CONTROL METHOD

(71) Applicant: NIDEC CORPORATION, Kyoto (JP)

(72) Inventors: Shuji Endo, Kyoto (JP); Sohei Miyake, Kyoto (JP); Daisuke Notsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 87 days.

(21) Appl. No.: 18/754,627

(22) Filed: Jun. 26, 2024

(65) Prior Publication Data

US 2025/0002074 A1     Jan. 2, 2025

Related U.S. Application Data

(60) Provisional application No. 63/523,925, filed on Jun. 29, 2023.

(30) Foreign Application Priority Data

Feb. 29, 2024     (JP) ................................. 2024-030606

(51) Int. Cl.
*B62D 5/04*          (2006.01)
*B62D 15/02*        (2006.01)
(52) U.S. Cl.
CPC ......... *B62D 5/0463* (2013.01); *B62D 15/025* (2013.01)

(58) Field of Classification Search
CPC .... B62D 5/0463; B62D 15/025; B62D 6/003; B62D 6/008; B62D 1/20; B62D 5/0466; B60W 30/12; B60W 50/00
See application file for complete search history.

(56) References Cited

FOREIGN PATENT DOCUMENTS

JP          2018-183046 A       11/2018
WO        WO-2021029329 A1 *    2/2021     ........... B62D 5/0463

* cited by examiner

*Primary Examiner* — Long T Tran
*Assistant Examiner* — Charles J Brauch
(74) *Attorney, Agent, or Firm* — Keating & Bennett, LLP

(57)          ABSTRACT

A control device includes a first assist controller to execute lane keeping control and generate a first input value, a second assist controller to generate a second input value based on a steering input value, and a disturbance sensitivity controller to which a command value calculated based on the first input value multiplied by a first gain and the second input value multiplied by a second gain is input. When the first gain is $K_1$ and the second gain is $K_2$, $K_1=1-K_2$ is satisfied. The disturbance sensitivity controller includes a first model following controller to generate a correction value to correct a command value based on output of a control target and a first nominal model. The first model following controller is configured or programmed such that a transfer function of the control target is restricted to a transfer function of the first nominal model.

11 Claims, 17 Drawing Sheets

Figure 2:
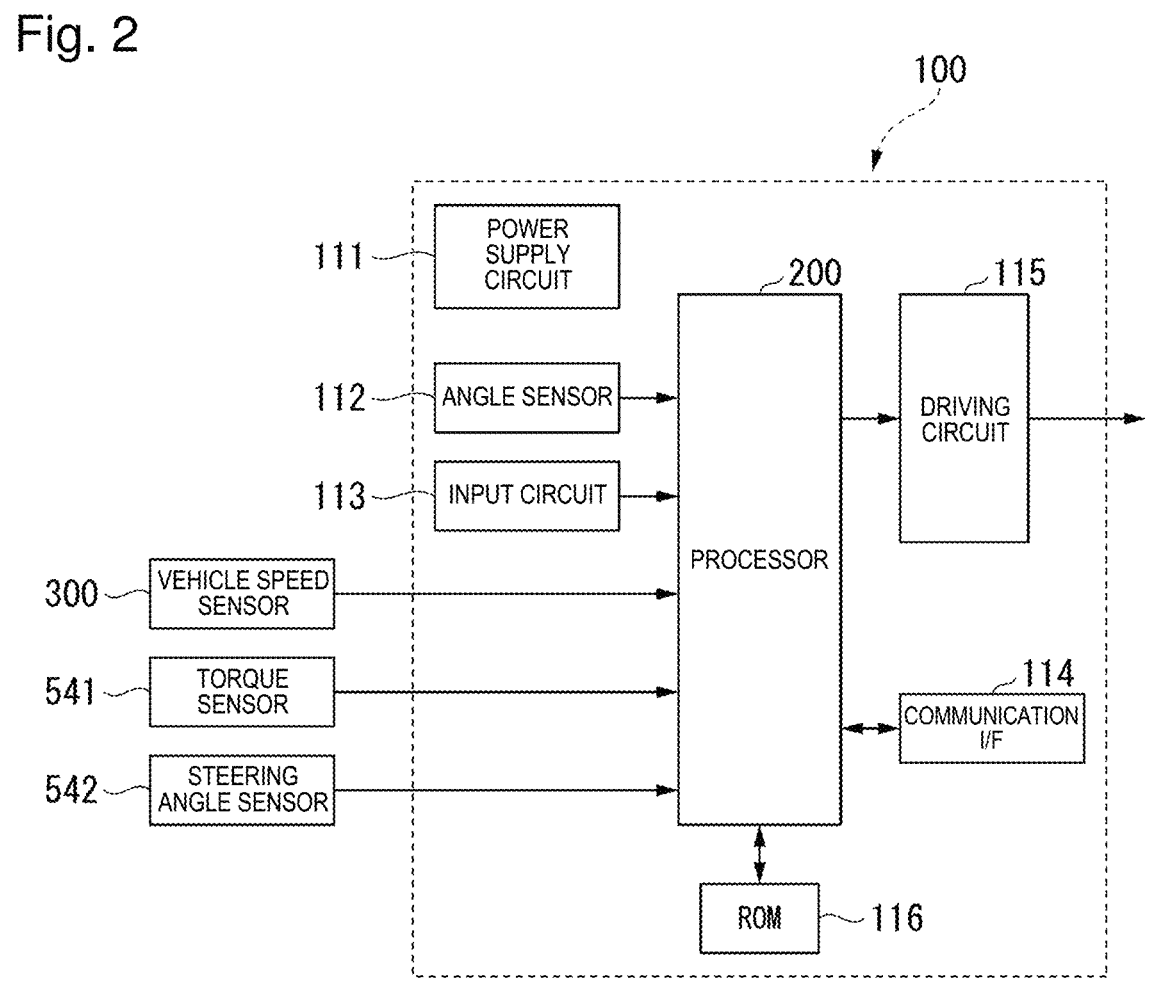

111 — POWER SUPPLY CIRCUIT

112 — ANGLE SENSOR

113 — INPUT CIRCUIT

300 — VEHICLE SPEED SENSOR

541 — TORQUE SENSOR

542 — STEERING ANGLE SENSOR

200 — PROCESSOR

115 — DRIVING CIRCUIT

114 — COMMUNICATION I/F

116 — ROM

Fig. 20

CONTROL DEVICE, ELECTRIC POWER STEERING DEVICE, AND CONTROL METHOD

CROSS-REFERENCE TO RELATED APPLICATIONS

The present application is a Non-Provisional Patent Application of US Provisional Patent Application No. 63/523,925, filed on Jun. 29, 2023, and claims priority under 35 U.S.C. § 119 to Japanese Patent Application No. 2024-030606, filed on Feb. 29, 2024, the entire contents of both priority applications being hereby incorporated herein by reference.

1. FIELD OF THE INVENTION

The present disclosure relates to control devices, electric power steering devices, and control methods.

2. BACKGROUND

Conventionally, an electric power steering system mounted on a vehicle is known.

The electric power steering system as described above may include, for example, a control device capable of executing lane keeping control. The lane keeping control is control that provides a driving force to a steering assembly by a motor to keep a vehicle in a lane in a case where the vehicle is likely to deviate from the lane. When a control amount of the lane keeping control is large, a sense of discomfort felt by a steering person from a steering wheel becomes large. On the other hand, when a control amount of the lane keeping control is reduced in order to reduce a sense of discomfort of a steering person, there has been a problem that it is difficult to sufficiently control a vehicle by the lane keeping control, and accuracy of keeping the vehicle in a lane is lowered.

SUMMARY

One example embodiment of a control device of the present disclosure controls a steering assembly mounted on a vehicle. The control device includes a first assist controller to execute lane keeping control to keep the vehicle in a lane and generate a first input value, a second assist controller to generate a second input value based on a steering input value input from a steering wheel of the vehicle, and a disturbance sensitivity controller to which a command value calculated based on the first input value multiplied by a first gain and the second input value multiplied by a second gain is input. The first gain and the second gain are variable values. When the first gain is set to $K_1$ and the second gain is set to $K_2$, $K_1=1-K_2$ is satisfied. The disturbance sensitivity controller includes a first model following controller to generate a correction value to correct the command value based on output of a control target including a motor provided in the steering assembly and a first nominal model based on a configuration of the control target. The first model following controller is configured or programmed such that a transfer function of the control target is restricted to a transfer function of the first nominal model in a frequency band in which a complementary sensitivity gain, which is a gain in a gain characteristic of a complementary sensitivity function with respect to a modeling error between the control target and the first nominal model, is one or substantially one. The complementary sensitivity function includes a variable parameter that changes based on the second gain.

One example embodiment of an electric power steering device of the present disclosure includes the control device and the steering assembly.

One example embodiment of a control method of the present disclosure is a control method of controlling a steering assembly mounted on a vehicle. The control method includes executing lane keeping control to keep the vehicle in a lane, generating a first input value by the lane keeping control, generating a second input value based on a steering input value input from a steering wheel of the vehicle, calculating a command value based on the first input value multiplied by a first gain and the second input value multiplied by a second gain, executing model following control to generate a correction value for correcting the command value based on output of a control target including a motor provided in the steering assembly and a first nominal model based on a configuration of the control target, and restricting a transfer function of the control target to a transfer function of the first nominal model in a frequency band in which a complementary sensitivity gain, which is a gain in a gain characteristic of a complementary function with respect to a modeling error between the control target and the first nominal model, is one or substantially one by the model following control. The first gain and the second gain are variable values. When the first gain is set to $K_1$ and the second gain is set to $K_2$, $K_1=1-K_2$ is satisfied. The complementary sensitivity function includes a variable parameter that changes based on the second gain.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 2 is a block diagram illustrating a configuration of a control device according to the first example embodiment.

FIG. 20 is a block diagram illustrating a configuration of the yaw rate controller according to a third example embodiment of the present disclosure.

DETAILED DESCRIPTION

Figure 1:
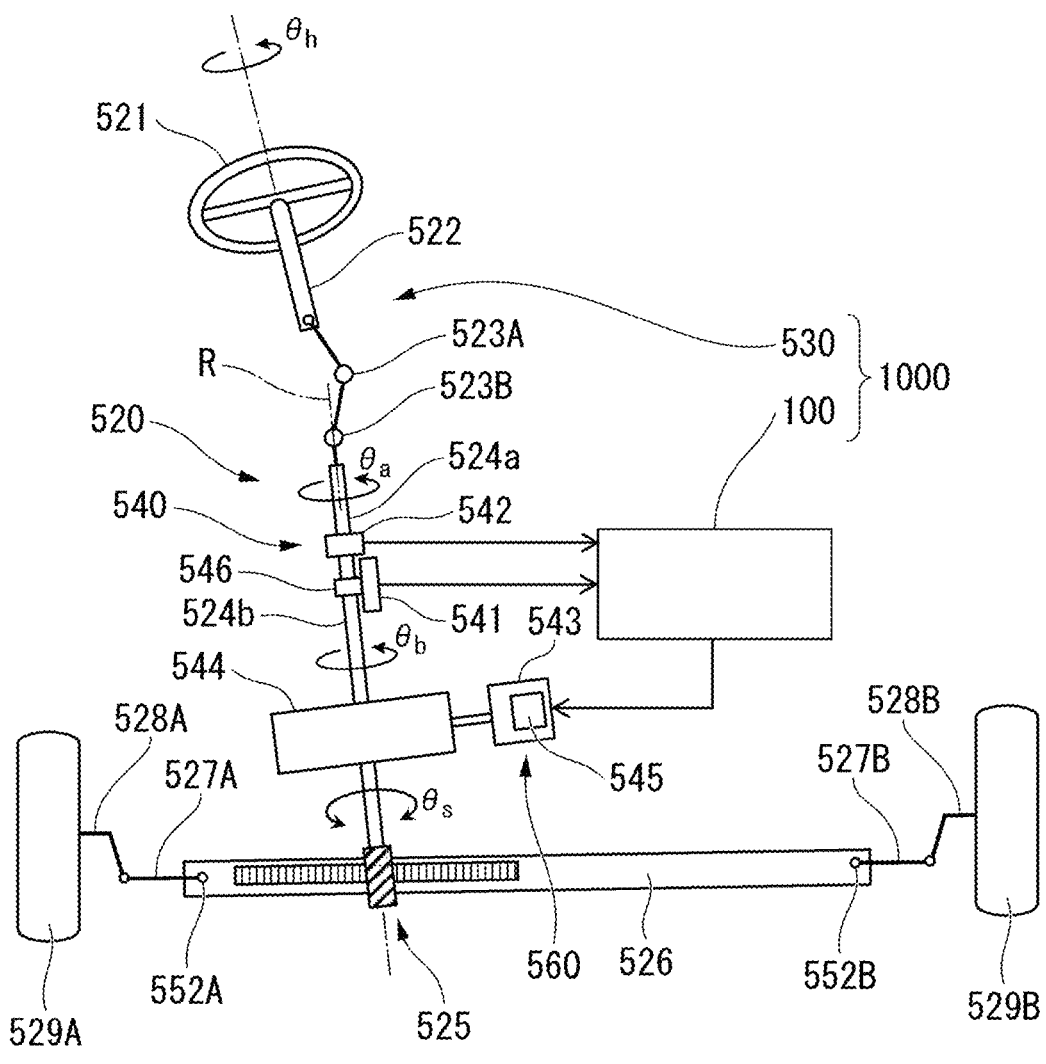
FIG. 1 is a diagram schematically illustrating an electric power steering device according to a first example embodiment of the present disclosure.

An electric power steering device 1000 of the present example embodiment illustrated in FIG. 1 is mounted on a vehicle V. As illustrated in FIG. 1, the electric power steering device 1000 includes a steering assembly 530 and a control device 100. The steering assembly 530 includes a steering assembly unit 520 and an auxiliary mechanism unit 540. The electric power steering device 1000 controls the auxiliary mechanism unit 540 by the control device 100 to generate an auxiliary torque that assists a steering torque $T_h$ generated in the steering assembly unit 520 when a driver who drives the vehicle V steers a steering wheel 521. The auxiliary torque reduces burden of driver's operation when the driver operates the steering wheel 521. A driver of the vehicle V is a steering person who steers the steering wheel 521 of the vehicle V.

The steering assembly unit 520 includes the steering wheel 521, a steering shaft 522, universal joints 523A and 523B, an input shaft 524*a*, an output shaft 524*b*, a rack and pinion mechanism 525, a rack shaft 526, right and left ball joints 552A and 552B, tie rods 527A and 527B, knuckles 528A and 528B, and right and left tires 529A and 529B. That is, the steering assembly 530 includes the steering wheel 521, the steering shaft 522, the universal joints 523A and 523B, the input shaft 524*a*, the output shaft 524*b*, the rack and pinion mechanism 525, the rack shaft 526, the right and left ball joints 552A and 552B, the tie rods 527A and 527B, the knuckles 528A and 528B, and the right and left tires 529A and 529B.

The steering shaft 522 is a shaft extending from the steering wheel 521 steered by a steering person. One end portion of the input shaft 524*a* is connected to an end portion of the steering shaft 522 on a side opposite to a side connected to the steering wheel 521 via the universal joints 523A and 523B. As a result, the steering wheel 521 is connected to the input shaft 524*a* via the universal joints 523A and 523B and the steering shaft 522. The output shaft 524*b* is connected to the input shaft 524*a* via a torsion bar 546 described later. More specifically, one end portion of the output shaft 524*b* is connected to another end portion of the input shaft 524*a* via the torsion bar 546. Another end portion of the output shaft 524*b* is connected to the rack shaft 526 via the rack and pinion mechanism 525.

The input shaft 524*a* and the output shaft 524*b* are coaxially arranged. The input shaft 524*a* and the output shaft 524*b* are rotatable about the same central axis. The input shaft 524*a* and the output shaft 524*b* are relatively rotatable with respect to each other in a range in which the torsion bar 546 described later can be twisted.

The auxiliary mechanism unit 540 includes a steering torque sensor 541, a steering angle sensor 542, a motor 543, a deceleration mechanism 544, an inverter 545, and the torsion bar 546. That is, the steering assembly 530 includes the steering torque sensor 541, the steering angle sensor 542, the motor 543, the deceleration mechanism 544, the inverter 545, and the torsion bar 546. The torsion bar 546 connects the input shaft 524*a* and the output shaft 524*b*. The torsion bar 546 is arranged coaxially with the input shaft 524*a* and the output shaft 524*b*. In description below, a virtual axis passing through a common central axis of the input shaft 524*a*, the output shaft 524*b*, and the torsion bar 546 is referred to as a rotation axis R. The torsion bar 546 can be twisted around the rotation axis R.

The steering torque sensor 541 detects the steering torque $T_h$ in the steering assembly unit 520 by detecting an amount of torsion around the rotation axis R of the torsion bar 546. The steering torque $T_h$ is a torsion bar torque generated in the torsion bar 546, and is a torsional moment around the rotation axis R. The steering angle sensor 542 can detect a rotation angle $\theta_a$ around the rotation axis R of the input shaft 524*a*. The rotation angle $\theta_a$ of the input shaft 524*a* is equal to a steering angle $\theta_h$ of the steering wheel 521. That is, the steering angle sensor 542 can detect the steering angle $\theta_h$ of the steering wheel 521 by detecting the rotation angle $\theta_a$ of the input shaft 524*a*. A rotation angle $\theta_b$ of the output shaft 524*b* can be detected based on the steering torque sensor 541 and the steering angle sensor 542. The rotation angle $\theta_b$ of the output shaft 524*b* is a steering angle $\theta_s$.

The inverter 545 converts DC power into three-phase AC power having U-phase, V-phase, and W-phase pseudo sine waves in accordance with a motor driving signal input from the control device 100, and supplies the power to the motor 543. The motor 543 is connected to the output shaft 524*b* via the deceleration mechanism 544. Three-phase AC power is supplied from the inverter 545 to the motor 543. The motor 543 is, for example, an interior permanent magnet synchronous motor (IPMSM), a surface mounted permanent magnet synchronous motor (SPMSM), a switched reluctance motor (SRM), or the like. When three-phase AC power is supplied from the inverter 545, the motor 543 generates an auxiliary torque according to the steering torque $T_h$. The motor 543 transmits the generated auxiliary torque to the output shaft 524*b* via the deceleration mechanism 544.

The control device 100 is a control device that controls a steering assembly 530 mounted on the vehicle V. In the present example embodiment, the control device 100 can control the first control target 560. The first control target 560 is a control target including the motor 543 provided in the steering assembly 530. In the present example embodiment, the first control target 560 includes the steering assembly unit 520, the torsion bar 546, the motor 543, and the deceleration mechanism 544. Since the first control target 560 includes the input shaft 524*a* and the output shaft 524*b* that can rotate relative to each other via the torsion bar 546, a motion of the first control target 560 cannot be described only by a simple equation of motion of a one-inertia system. The first control target 560 changes between a one-inertia system and a two-inertia system depending on strength with which a steering person grips the steering wheel 521. The stronger a steering person grips the steering wheel 521, the closer the first control target 560 is to a one-inertia system. The weaker a steering person grips the steering wheel 521, the closer the first control target 560 is to a two-inertia system. As described above, the first control target 560 includes a two-inertia system.

The control device 100 is electrically connected to the inverter 545. The control device 100 generates a motor driving signal based on a detection signal detected by the steering torque sensor 541, the steering angle sensor 542, a vehicle speed sensor 300 mounted on the vehicle V, and the like and outputs the motor driving signal to the inverter 545. The control device 100 controls the first control target 560 by controlling rotation of the motor 543 via the inverter 545. More specifically, the control device 100 controls switching operation of a plurality of switching elements included in the inverter 545. Specifically, the control device 100 generates a control signal for controlling switching operation of each switching element and outputs the control signal to the inverter 545. Each switching element is, for example, a metal-oxide-semiconductor field-effect transistor (MOSFET). In description below, a control signal for controlling switching operation of each switching element is referred to as a "gate control signal".

The control device 100 generates a torque command value based on the steering torque $T_h$ and the like, and controls a torque of the motor 543 and a rotational speed of the motor 543 by means of, for example, vector control. The vector control is a method in which current flowing through the motor 543 is separated into a current component that contributes to generation of a torque and a current component that contributes to generation of a magnetic flux, and the current components orthogonal to each other are independently controlled. The control device 100 may perform not only the vector control but also another piece of closed-loop control. A rotational speed of the motor 543 is expressed by, for example, a rotational speed [revolutions per minute (rpm)] at which a rotor rotates in one minute, a rotational speed [revolutions per second (rps)] at which a rotor rotates in one second, or the like.

Note that a value of the steering torque $T_h$ may be directly input to the control device 100 from the steering torque sensor 541, or the control device 100 may calculate a value of the steering torque $T_h$ from an output value of the steering torque sensor 541. A value of the steering angle $\theta_h$ of the steering wheel 521 may be directly input to the control device 100 from the steering angle sensor 542, or the control device 100 may calculate a value of the steering angle $\theta_h$ from an output value of the steering angle sensor 542.

Further, the control device 100 and the motor 543 are modularized and manufactured and sold as a motor module. The motor module includes the motor 543 and the control device 100, and is suitably used for the electric power steering device 1000. Further, the control device 100 may be manufactured and sold as a control device for controlling the electric power steering device 1000 independently of the motor 543.

FIG. 2 illustrates a typical example of a configuration of the control device 100 according to the present example embodiment. The control device 100 includes a power supply circuit 111, an angle sensor 112, an input circuit 113, a communication I/F 114, a driving circuit 115, a ROM 116, and a processor 200, for example. The control device 100 may be realized as a printed circuit board (PCB) on which these electronic components are mounted.

In the processor 200, the vehicle speed sensor 300 mounted on the vehicle V, the steering torque sensor 541, and the steering angle sensor 542 are communicably connected to the processor 200. A vehicle speed is transmitted from the vehicle speed sensor 300 to the processor 200. The steering torque $T_h$ is transmitted from the steering torque sensor 541 to the processor 200. The steering angle $\theta_h$ is transmitted from the steering angle sensor 542 to the processor 200.

The processor 200 is a semiconductor integrated circuit, and is also referred to as a central processing unit (CPU) or a microprocessor. The processor 200 sequentially executes computer programs which are stored in the ROM 116 and describe commands for controlling motor driving, and realizes desired processing. In addition to the processor 200 or instead of the processor 200, the control device 100 may include a field programmable gate array (FPGA) equipped with a CPU, a graphics processing unit (GPU), an application specific integrated circuit (ASIC), an application specific standard product (ASSP), or a combination of two or more circuits selected from these circuits. The processor 200 sets a current command value according to an actual current value, a rotation angle of a rotor of the motor 543, and the like, generates a pulse width modulation (PWM) signal, and outputs the PWM signal to the driving circuit 115.

The power supply circuit 111 is connected to an external power supply (not illustrated). The power supply circuit 111 generates DC voltage necessary for each unit of the control device 100. DC voltage generated in the power supply circuit 111 is, for example, 3 V or 5 V.

The angle sensor 112 detects a rotation angle of a rotor of the motor 543, and outputs the rotation angle to the processor 200. The angle sensor 112 may be a resolver, a Hall element such as a Hall IC, or an MR sensor having a magnetoresistive element. The processor 200 can calculate an angular velocity ω [rad/s] of the motor 543 based on an electrical angle θm of the motor 543 obtained based on the angle sensor 112. Note that the control device 100 may include, instead of the angle sensor 112, a speed sensor capable of detecting a rotational angular velocity of the motor 543 and an acceleration sensor capable of detecting a rotational angular acceleration of the motor 543.

A motor current value detected by a current sensor (not illustrated) is input to the input circuit 113. In description below, a motor current value detected by a current sensor (not illustrated) is referred to as an "actual current value". The input circuit 113 converts a level of an input actual current value into an input level of the processor 200 as necessary, and outputs the actual current value to the processor 200. A typical example of the input circuit 113 is an analog-digital conversion circuit.

The communication I/F 114 is an input and output interface for transmitting and receiving data in conformity with an in-vehicle controller area network (CAN), for example.

The driving circuit 115 is typically a gate driver or a pre-driver. The driving circuit 115 generates a gate control signal in accordance with a PWM signal, and gives the gate control signal to gates of a plurality of switching elements included in the inverter 545. For example, when the motor 543 to be driven is a motor that can be driven at a low voltage, the driving circuit 115 as a gate driver is not necessarily required in some cases. In that case, a function of a gate driver in the driving circuit 115 may be implemented in the processor 200.

The ROM 116 is electrically connected to the processor 200. The ROM 116 is a writable memory, a rewritable memory, or a read-only memory, for example. Examples of the writable memory include a programmable read only memory (PROM). Examples of the rewritable memory include a flash memory, an electrically erasable programmable read only memory (EEPROM), and the like. The ROM 116 stores a program including commands for causing the processor 200 to control motor driving. For example, a control program stored in the ROM 116 is once loaded into a RAM (not illustrated) at the time of booting.

Figure 3:
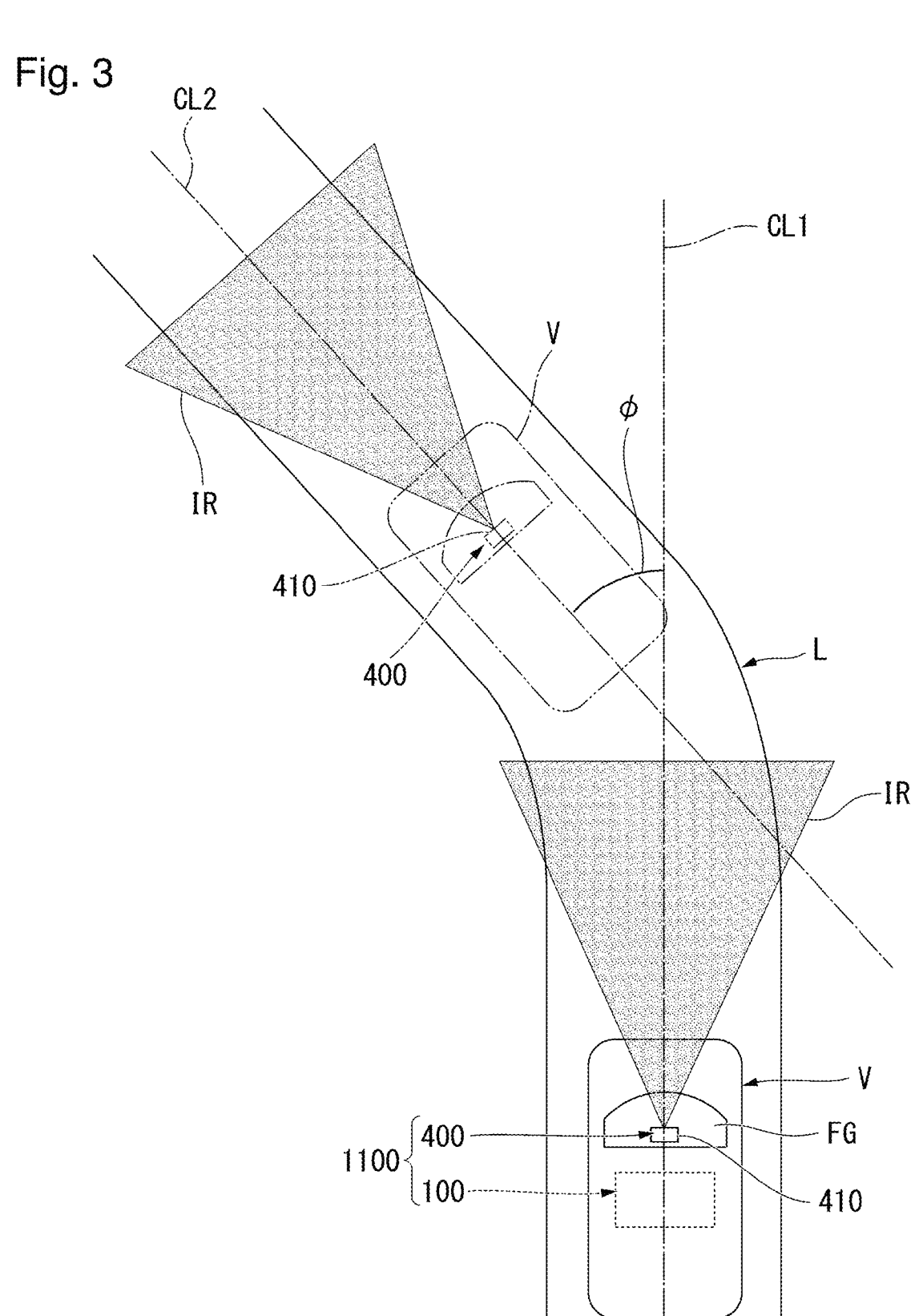
FIG. 3 is a diagram schematically illustrating a case where a vehicle including a lane keeping system according to the first example embodiment travels in a lane.

As illustrated in FIG. 3, a lane keeping system 1100 includes the control device 100 and an imaging device 400. The lane keeping system 1100 is a system for keeping the vehicle V driven by a person at the center of a lane L. When the vehicle V is about to deviate from the center of the lane L based on an image of the lane L captured by the imaging device 400, the lane keeping system 1100 controls the steering assembly 530 by the control device 100 to return the vehicle V to a position at the center of the lane L. The imaging device 400 is attached to, for example, a windshield FG of the vehicle V.

Figure 4:
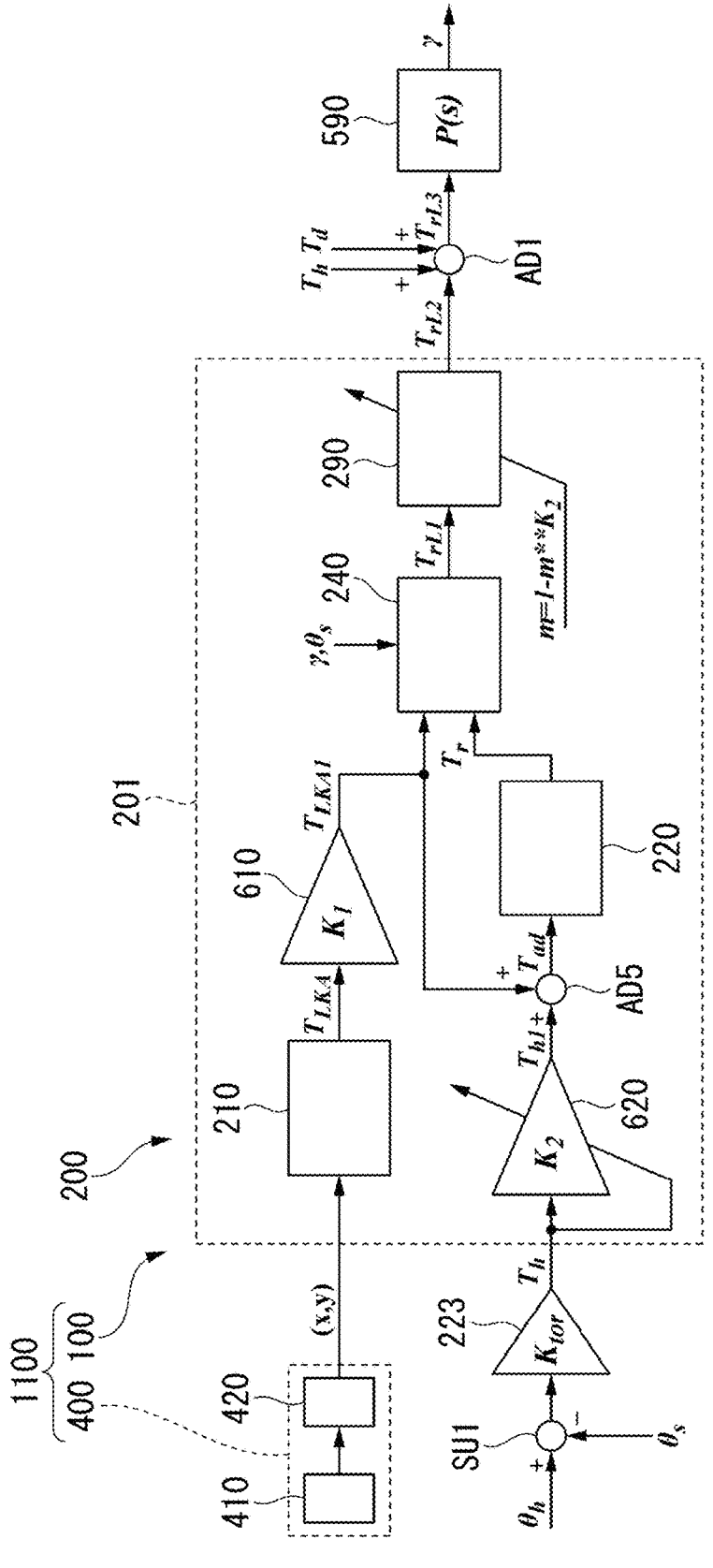
FIG. 4 is a block diagram illustrating a configuration of the lane keeping system according to the first example embodiment.

As illustrated in FIG. 4, the imaging device 400 includes an imaging device main body 410 and an imaging device controller 420. The imaging device main body 410 images a portion located in front of the vehicle V of the lane L. The imaging device main body 410 is, for example, a camera including a charge coupled device (CCD) image sensor. The imaging device controller 420 controls the imaging device main body 410. Similarly to the processor 200, the imaging device controller 420 is a semiconductor integrated circuit. The imaging device controller 420 outputs target coordinates x and y based on an image captured by the imaging device main body 410.

FIG. 4 illustrates an example of a functional block of the processor 200 of the present example embodiment. The processor 200, which is a computer, sequentially executes processing or tasks necessary for controlling the steering assembly 530 by using each functional block. Each functional block of the processor 200 illustrated in FIG. 4 may be implemented in the processor 200 as software such as firmware, may be implemented in the processor 200 as hardware, or may be implemented in the processor 200 as software and hardware. Processing of each functional block in the processor 200 is typically described in a computer program in units of software modules and stored in the ROM 116. However, in a case where an FPGA or the like is used, all or a part of the functional blocks may be implemented as a hardware accelerator. Further, a method of controlling the control device 100 according to the present example embodiment may be implemented as a program causes a computer to execute desired operation.

The processor 200 includes a controller 201, a subtractor SU1, and a torque conversion unit 223. The controller 201 includes a first assist controller 210, a second assist controller 220, a vehicle stabilization controller 240, a disturbance sensitivity controller 290, a first gain adjustment portion 610, a second gain adjustment portion 620, and an adder AD5. That is, the control device 100 includes the first assist controller 210, the second assist controller 220, the vehicle stabilization controller 240, the disturbance sensitivity controller 290, the first gain adjustment portion 610, the second gain adjustment portion 620, and the adder AD5. In other words, functions corresponding to the first assist controller 210, the second assist controller 220, the vehicle stabilization controller 240, the disturbance sensitivity controller 290, the first gain adjustment portion 610, the second gain adjustment portion 620, and an adder AD1 are implemented in the processor 200 of the control device 100.

Figure 5:
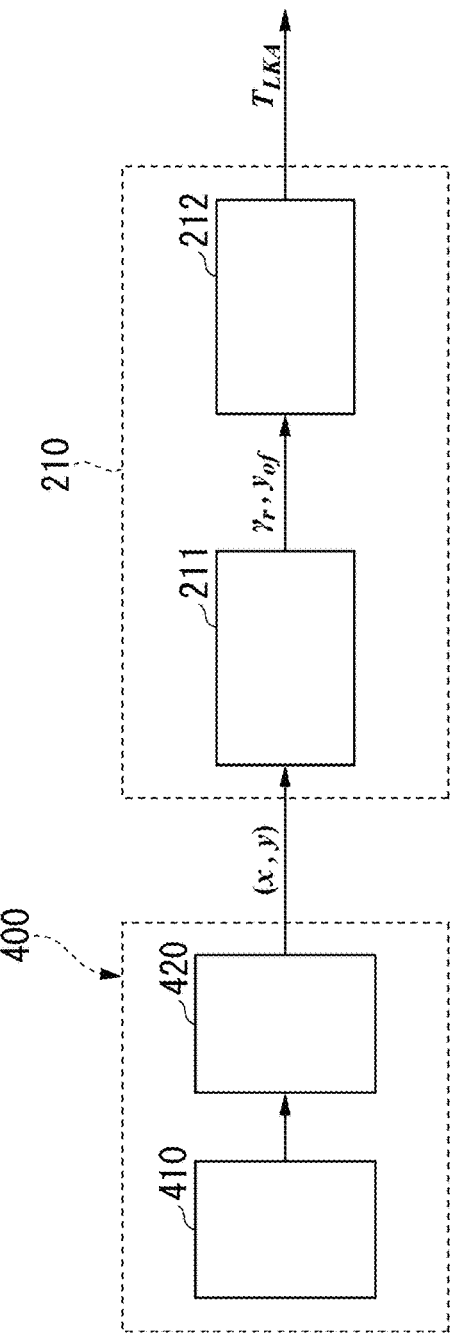
FIG. 5 is a block diagram illustrating a configuration of an imaging device and a first assist controller according to the first example embodiment.

The first assist controller 210 can execute lane keeping control for keeping the vehicle V in the lane L. As illustrated in FIG. 5, the first assist controller 210 includes a vehicle state calculator 211 and a lane keeping controller 212. The vehicle state calculator 211 calculates a yaw rate target value $\gamma_r$ which is a target value of a yaw rate $\gamma$ of the vehicle V and lateral displacement $y_{of}$ the vehicle V based on input from the imaging device 400. The yaw rate target value $\gamma_r$ is a yaw rate $\gamma$ required for the vehicle V not to deviate from the inside of the lane L.

The yaw rate $\gamma$ in the vehicle V is a parameter indicating a change in the yaw angle $\varphi$ which is a rotation angle in a left-right direction of the vehicle V. In other words, the yaw rate $\gamma$ is an angular velocity when the vehicle V rotates in the left-right direction. In the example illustrated in FIG. 3, in the lane L provided with a curve curving to the left, the vehicle V before turning the curve is indicated by a solid line, and the vehicle V after turning the curve is indicated by a two-dot chain line. An angle formed by an imaginary line CL1 extending in a traveling direction of the vehicle V indicated by a solid line and an imaginary line CL2 extending in a traveling direction of the vehicle V indicated by a two-dot chain line is the yaw angle $\varphi$ that changes when the vehicle V turns the curve. Note that, for example, the imaginary lines CL1 and CL2 coincide with an optical axis of the imaging device main body 410 when viewed from the upper side in a vertical direction. An optical axis of the imaging device main body 410 passes through the center in the left-right direction of a region IR imaged by the imaging device main body 410.

Figure 6:
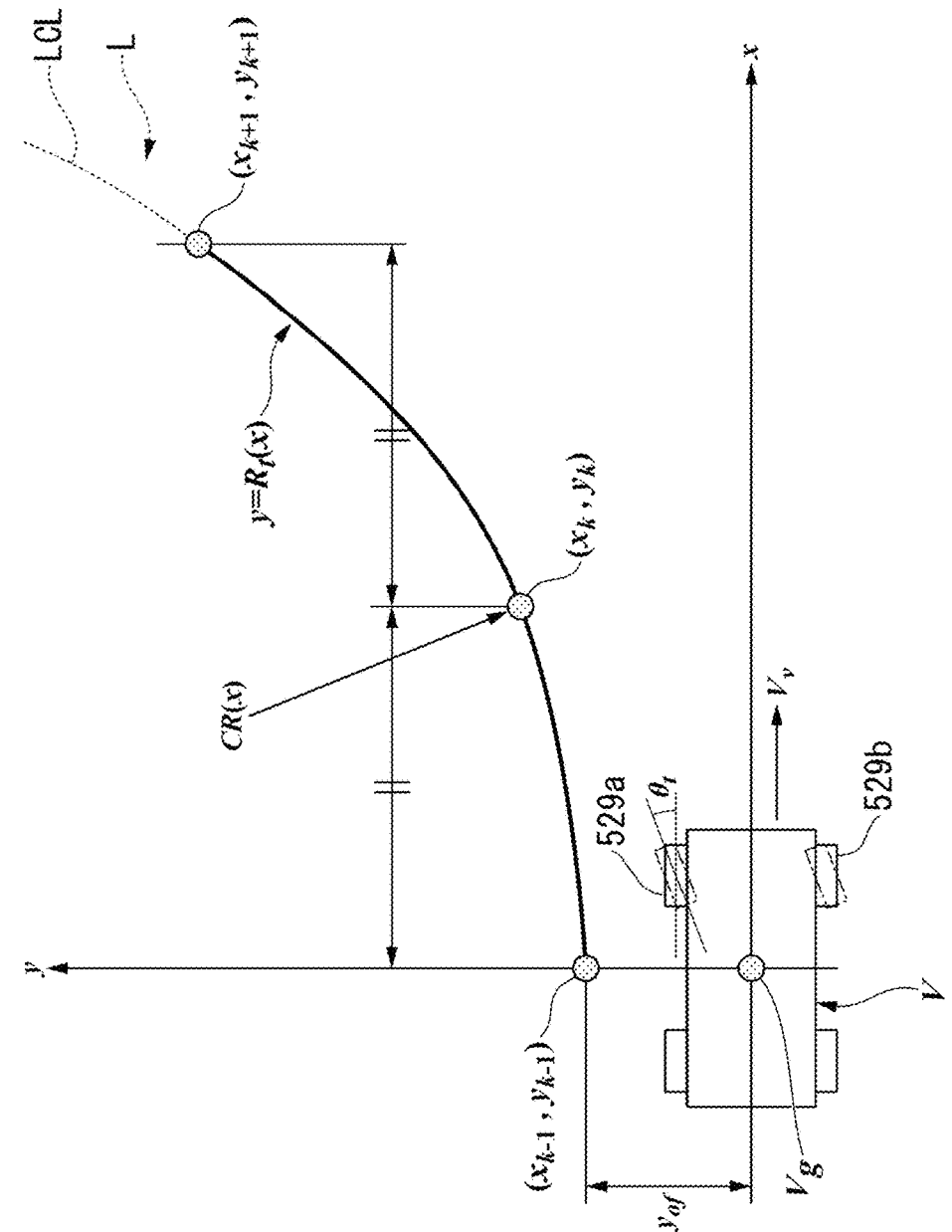
FIG. 6 is a diagram for explaining lane keeping control according to the first example embodiment.

FIG. 6 illustrates an xy coordinate system. The x axis is an axis extending in one direction in a horizontal direction. The y axis is an axis extending in one direction in the horizontal direction and extending in a direction orthogonal to the x axis. FIG. 6 illustrates an example when the vehicle V traveling in the x-axis direction curves in the y-axis direction. In the vehicle V traveling in the x-axis direction, the lateral displacement $y_{of}$ is a displacement amount of a position of the vehicle V in the y-axis direction with respect to a target route $R_f(x)$. The target route $R_f(x)$ is a target route through which the center of gravity $V_g$ of the vehicle V passes, and is located on a center line LCL of the lane L. A position of xy coordinates of the vehicle V illustrated in FIG. 6 is a position of xy coordinates of the center of gravity $V_g$ of the vehicle V. That is, the lateral displacement $y_{of}$ is a distance in the y-axis direction between the target route $R_f(x)$ and the center of gravity $V_g$. Note that at a position of the vehicle V illustrated in FIG. 6, xy coordinates of the center of gravity $V_g$ is (0, 0).

The vehicle state calculator 211 calculates the yaw rate target value $\gamma_r$ and the lateral displacement $y_{of}$ based on the target coordinates x and y input from the imaging device 400. In the present example embodiment, values of three target coordinates (x, y) of coordinates $(x_{k-1}, y_{k-1})$, coordinates (xk, yk), and coordinates $(x_{k+1}, y_{k+1})$ are input from the imaging device 400 to the vehicle state calculator 211. The three target coordinates (x, y) are coordinates included in the target route $R_t(x)$ on the target center line LCL. The coordinates $(x_{k-1}, y_{k-1})$ are coordinates on the target path $R_t(x)$ at a current position of the vehicle V in the x-axis direction. The coordinates $(x_{k+1}, y_{k+1})$ are coordinates on the target path $R_t(x)$ at a position in the x-axis direction ahead of a current position in the x-axis direction of the vehicle V. The coordinates $(xk, yk)$ are coordinates on the target path $R_t(x)$ at a position in the x-axis direction of the center between a position in the x-axis direction of the coordinates $(x_{k-1}, y_{k-1})$ and a position in the x-axis direction of the coordinates $(x_{k+1}, y_{k+1})$. The target path $R_t(x)$ is a target position in the y-axis direction with respect to a position in the x-axis direction. The target path $R_t(x)$ is expressed as, for example, Formula (1) below.

[Mathematical formula 1]

$$R_t(x) = \frac{C_{rp}}{6}x^3 + \frac{C_p}{2}x^2 + y_{of} \tag{1}$$

where $C_{rp}$ is a change rate of a curvature of the target path $R_t(x)$ at the coordinates $(x_{k+1}, y_{k+1})$, $C_p$ is a curvature of the target path $R_t(x)$ at the coordinates $(x_{k+1}, y_{k+1})$, and $y_{of}$ is lateral displacement of the vehicle V.

The vehicle state calculator 211 substitutes values of the three coordinates $(x_{k-1}, y_{k-1})$, $(xk, yk)$, and $(x_{k+1}, y_{k+1})$ into Formula (2) below to calculate a value of each term in Formula (1). By the above, the lateral displacement $y_{of}$ is calculated.

[Mathematical formula 2]

$$\begin{pmatrix} \frac{C_{rp}}{6} \\ \frac{C_p}{2} \\ y_{of} \end{pmatrix} = \begin{pmatrix} x_{k-1}^3 & x_{k-1}^2 & 1 \\ x_k^3 & x_k^2 & 1 \\ x_{k+1}^3 & x_{k+1}^2 & 1 \end{pmatrix}^{-1} \begin{pmatrix} y_{k-1} \\ y_k \\ y_{k+1} \end{pmatrix} \tag{2}$$

The vehicle state calculator 211 substitutes the change rate $C_{rp}$, the curvature $C_p$, and the coordinates $x_{k-1}$, $x_{k+1}$ calculated from Formula (2) above into Formula (3) below to calculate a curvature radius $R_c(x_{k-1})$ of the target route $R_t(x)$ at the coordinates $(x_{k-1}, y_{k-1})$.

[Mathematical formula 3]

$$R_c(x_{k-1}) = \frac{1}{C_{rp} \times (x_{k-1} - x_{k+1}) + C_p} \tag{3}$$

The vehicle state calculator 211 substitutes the curvature radius $R_c(x_{k-1})$ obtained based on Formula (3) above into Formula (4) below to calculate the yaw rate target value $\gamma_r$.

[Mathematical formula 4]

$$\gamma_r = \frac{V_v}{R_c(x_{k-1})} \tag{4}$$

where $V_v$ is a traveling speed of the vehicle V.

As described above, the vehicle state calculator 211 calculates the yaw rate target value $\gamma_r$ and the lateral displacement $y_{of}$. As illustrated in FIG. 5, the yaw rate target value $\gamma_r$ and the lateral displacement $y_{of}$ calculated by the vehicle state calculator 211 are input to the lane keeping controller 212.

Figure 7:
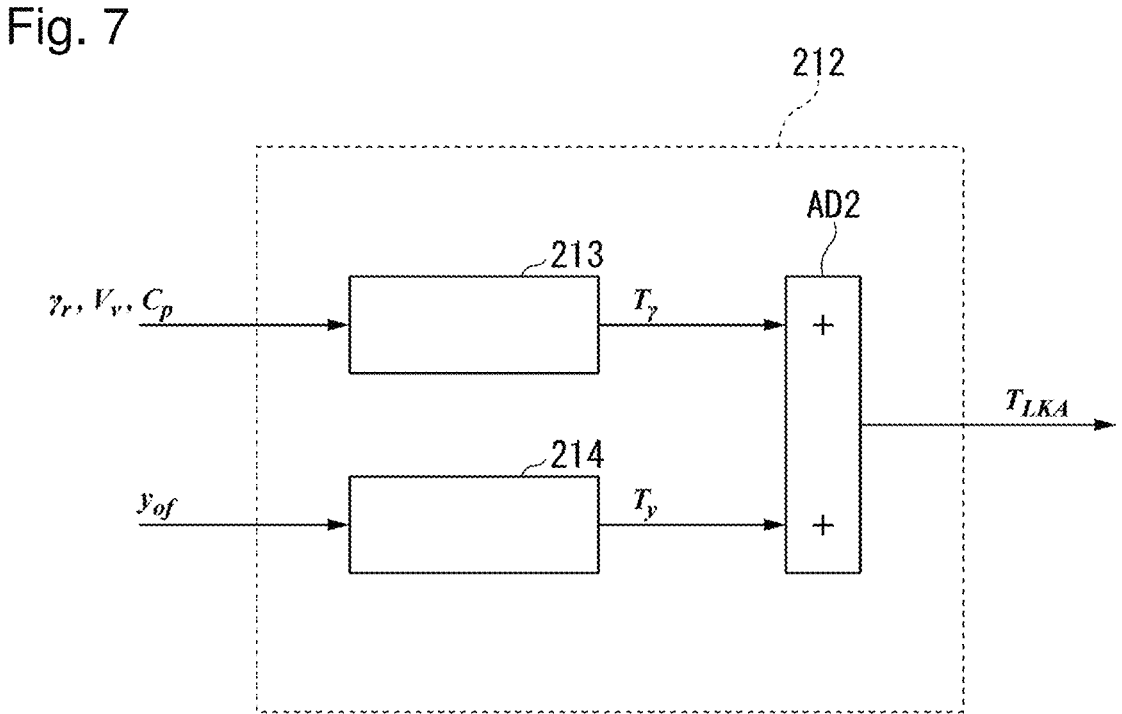
FIG. 7 is a block diagram illustrating a configuration of a lane keeping controller according to the first example embodiment.

The lane keeping controller 212 performs lane keeping control. The lane keeping controller 212 calculates a first command torque $T_{LKA}$ necessary for causing the vehicle V to travel on the target route $R_t(x)$. In the present example embodiment, the first command torque $T_{LKA}$ is a "first input value" generated by the first assist controller 210. As illustrated in FIG. 7, the lane keeping controller 212 includes a yaw rate controller 213, a lateral displacement controller 214, and an adder AD2. That is, the first assist controller 210 includes the yaw rate controller 213, the lateral displacement controller 214, and the adder AD2.

Figure 8:
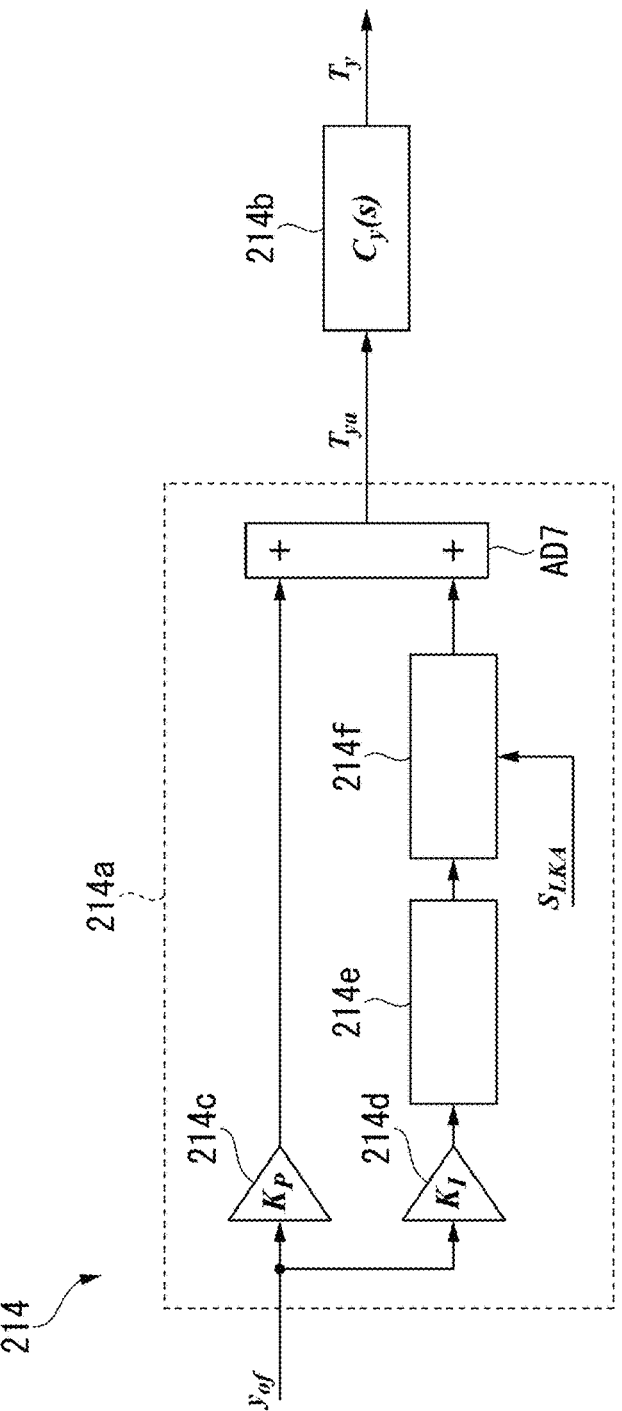
FIG. 8 is a block diagram illustrating a configuration of a lateral displacement controller according to the first example embodiment.

The lateral displacement controller 214 generates a lateral displacement command torque Ty based on the lateral displacement $y_{of}$. In the present example embodiment, the lateral displacement command torque Ty is a "lateral displacement command value" generated by the lateral displacement controller 214. As illustrated in FIG. 8, the lateral displacement controller 214 includes a command torque generation unit 214$a$ and a lateral displacement adjustment portion 214$b$. The command torque generation unit 214$a$ generates a lateral displacement command torque $T_{ya}$ based on the lateral displacement $y_{of}$. In the present example embodiment, the command torque generation unit 214$a$ outputs the lateral displacement command torque $T_{ya}$ that converges the lateral displacement $y_{of}$ to zero by feedback control in which an output value of the lateral displacement $y_{of}$ is fed back. The command torque generation unit 214$a$ performs PI control. The command torque generation unit 214$a$ includes a P gain unit 214$c$, an I gain unit 214$d$, an anti-windup controller 214$e$, an integral value reset unit 214$f$, and an adder AD7.

The lateral displacement $y_{of}$ is input to the P gain unit 214$c$ and the I gain unit 214$d$. A value obtained by multiplying the lateral displacement $y_{of}$ by a gain $K_p$ of the P gain unit 214$c$ is input to the adder AD7. A value obtained by multiplying the lateral displacement $y_{of}$ by a gain Kr of the I gain unit 214$d$ is input to the anti-windup controller 214$e$. The anti-windup controller 214$e$ performs anti-windup control. In I control, when integral value continues to stick to set upper and lower limit values, the integral value exceeds a target value and overshoot occurs. In order to prevent the overshoot, the anti-windup controller 214$e$ performs anti-windup control. Output from the anti-windup controller 214$e$ is input to the integral value reset unit 214$f$.

Output from the anti-windup controller 214$e$ and a signal $S_{LKA}$ indicating whether or not lane keeping control is being executed are input to the integral value reset unit 214$f$. In a case where the signal $S_{LKA}$ is a signal indicating that the lane keeping control is being executed, the integral value reset unit 214$f$ functions as an integrator having a transfer function of $1/s$. A value s is a Laplace transformer. In a case where the signal $S_{LKA}$ is a signal indicating that lane keeping control is not being executed, the integral value reset unit 214$f$ sets output to zero. Output from the integral value reset unit 214$f$ is input to the adder AD7. The adder AD7 adds output from the P gain unit 214 $c$ and output from the integral value reset unit 214$f$ to generate the lateral displacement command torque $T_{ya}$, and outputs the lateral displacement command torque $T_{ya}$ to the lateral displacement adjustment portion 214$b$.

Figure 9:
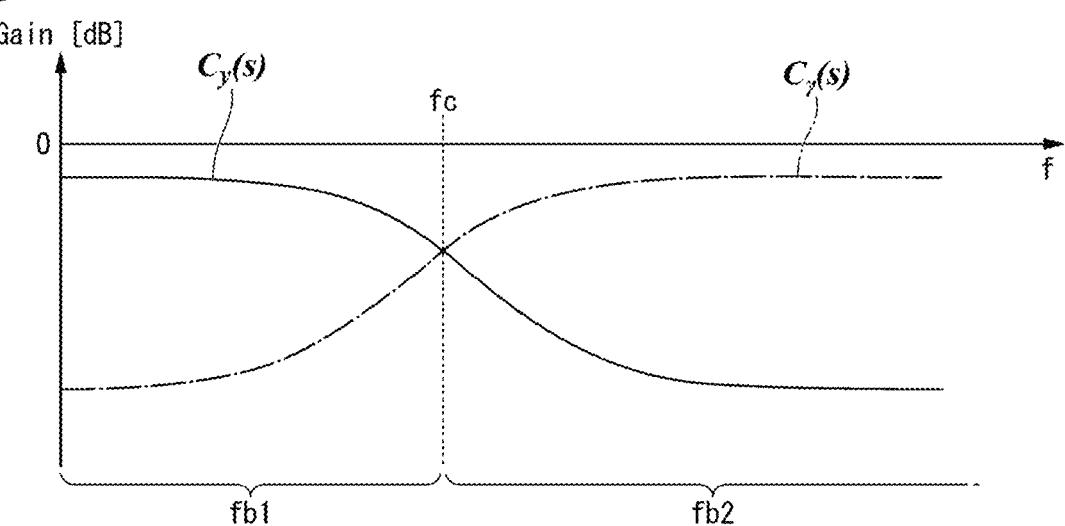
FIG. 9 is a Bode diagram illustrating an example of a gain of a transfer function of a lateral displacement adjustment portion and a gain of a transfer function of a yaw rate adjustment portion according to the first example embodiment.

The lateral displacement adjustment portion 214$b$ adjusts the lateral displacement command torque $T_{ya}$ input from the command torque generation unit 214$a$ according to a frequency, and outputs the lateral displacement command torque $T_{ya}$ as the lateral displacement command torque $T_y$. The lateral displacement adjustment portion 214$b$ extracts a low frequency band from the lateral displacement command torque $T_{ya}$ and outputs the low frequency band as the lateral displacement command torque $T_y$ in order to perform switching by a frequency band. As illustrated in FIG. 9, a gain of a transfer function $C_y(s)$ of the lateral displacement adjustment portion 214b is high in a band in which a frequency f is low and is low in a band in which the frequency f is high. More specifically, a gain of the transfer function $C_y(s)$ of the lateral displacement adjustment portion 214b in a second frequency band fb2 is lower than a gain of the transfer function $C_y(s)$ of the lateral displacement adjustment portion 214b in a first frequency band fb1. The second frequency band fb2 is a frequency band higher than the first frequency band fb1. The first frequency band fb1 is a frequency band equal to or less than a frequency fc. The second frequency band fb2 is a frequency band higher than the frequency fc. The frequency fc is, for example, about 0.1 Hz or more and about 0.2 Hz or less. Note that the first frequency band fb1 and the second frequency band fb2 may be frequency bands provided apart from each other.

The lateral displacement adjustment portion 214b is, for example, a low-pass filter in which a cutoff frequency is the above-described frequency fc. The lateral displacement adjustment portion 214b may be a phase delay compensation unit that performs phase delay compensation in which a pole is the above-described frequency fc. The lateral displacement adjustment portion 214b outputs, as the lateral displacement command torque $T_y$, a torque in a band less than or equal to the frequency fc in the lateral displacement command torque $T_{ya}$ input from the command torque generation unit 214a. As described above, the lateral displacement adjustment portion 214b adjusts the lateral displacement command torque $T_{ya}$ according to the frequency f. Note that the lateral displacement adjustment portion 214b may indirectly adjust the lateral displacement command torque $T_y$ according to the frequency f by adjusting the yaw rate target value $\gamma_r$ before being converted into a torque according to the frequency f.

Figure 10:
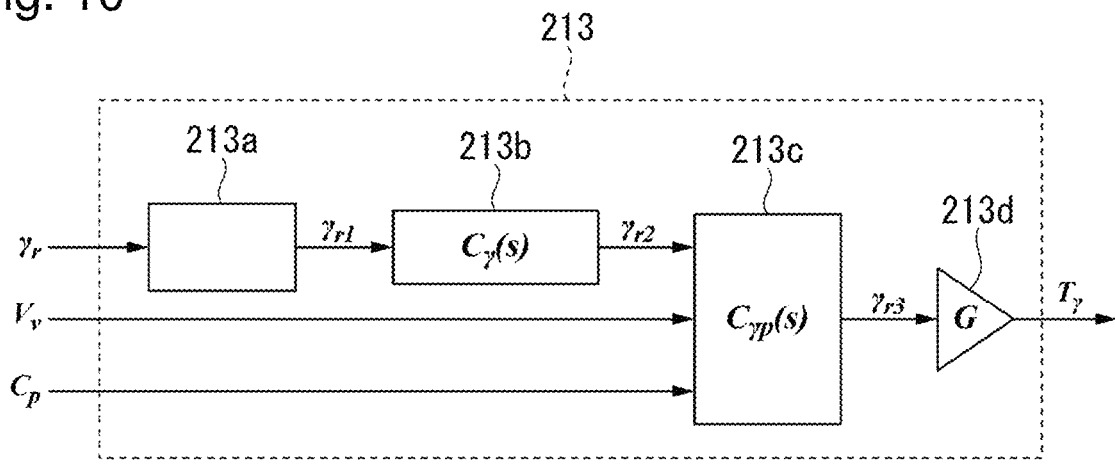
FIG. 10 is a block diagram illustrating a configuration of a yaw rate controller according to the first example embodiment.

As illustrated in FIG. 7, the yaw rate controller 213 generates a yaw rate command torque $T_y$ based on the yaw rate target value $\gamma_r$. In the present example embodiment, the yaw rate command torque $T_y$ is a "yaw rate command value" generated by the yaw rate controller 213. The yaw rate target value $\gamma_r$, the traveling speed $V_v$ of the vehicle V, and the curvature $C_p$ of the target route $R_t(x)$ at the coordinates $(x_{k+1}, y_{k+1})$ are input to the yaw rate controller 213. As illustrated in FIG. 10, the yaw rate controller 213 includes a yaw rate linearization phase compensation unit 213a, a yaw rate adjustment portion 213b, a yaw rate phase adjustment portion 213c, and a torque conversion unit 213d.

The yaw rate linearization phase compensation unit 213a performs phase compensation to linearly approximate and use a relationship between the steering torque $T_h$ and the yaw rate $\gamma$ without exciting natural vibration of the yaw rate $\gamma$. In the present example embodiment, the yaw rate linearization phase compensation unit 213a performs phase delay compensation on the input yaw rate target value $\gamma_r$ and reduces a gain in a frequency band of a predetermined frequency $f_d$ or more. The predetermined frequency $f_d$ is lower than a parameter $f_n$ set by model following control in the vehicle stabilization controller 240. The parameter $f_n$ is a parameter corresponding to a natural frequency $f_\gamma$ of the yaw rate $\gamma$. The predetermined frequency $f_d$ is, for example, 0.5 Hz. The parameter $f_n$ corresponding to the natural frequency $f_\gamma$ of the yaw rate $\gamma$ is, for example, 2 Hz or more and 4 Hz or less. The yaw rate linearization phase compensation unit 213a performs phase compensation on the yaw rate target value $\gamma_r$ and outputs the value as the yaw rate target value $\gamma_{r1}$ to the yaw rate adjustment portion 213b.

In the present example embodiment, since disturbance can be compensated in the disturbance sensitivity controller 290, a characteristic of the vehicle V can be restrained to a characteristic in which a relationship between the steering torque $T_h$ and the yaw rate $\gamma$ is a linear relationship satisfying $T_h=G\gamma$ by model following control in the vehicle stabilization controller 240. G is a proportional constant determined by tuning. A range in which a characteristic of the vehicle V can be restricted to the characteristic by the vehicle stabilization controller 240 is a range in which the frequency f of the input steering torque $T_h$ is lower than the natural frequency $f_\gamma$ of the yaw rate $\gamma$. For this reason, by reducing a gain of the yaw rate target value $\gamma_r$ in a frequency band of the predetermined frequency f that is lower than the natural frequency $f_\gamma$ by the yaw rate linearization phase compensation unit 213a, the yaw rate target value $\gamma_r$ can be used within a range satisfying $T_h=G\gamma$. By the above, a relationship between the steering torque $T_h$ and the yaw rate $\gamma$ can be linearly approximated and used without excitation of natural vibration of the yaw rate Y. Further, in the present example embodiment, as phase delay compensation is performed in the yaw rate linearization phase compensation unit 213a, it is possible to realize delay time that is generated until the steering wheel 521 is actually steered after a steering person recognizes a predicted arrival point in a case where control by the first assist controller 210 is not performed. By the above, in a case where the assist control is performed by the first assist controller 210, it is possible to reduce a sense of discomfort of a steering person steering the steering wheel 521.

The yaw rate adjustment portion 213b adjusts the yaw rate target value $\gamma_{r1}$ according to a frequency. As illustrated in FIG. 9, a gain of a transfer function $C_\gamma(s)$ of the yaw rate adjustment portion 213b is low in a band where the frequency f is low and high in a band where the frequency f is high. More specifically, a gain of the transfer function $C_\gamma(s)$ of the yaw rate adjustment portion 213b in the first frequency band fb1 is lower than a gain of the transfer function $C_\gamma(s)$ of the yaw rate adjustment portion 213b in the second frequency band fb2 higher than the first frequency band fb1. The yaw rate adjustment portion 213b is, for example, a high-pass filter in which a cutoff frequency is the above-described frequency fc. The yaw rate adjustment portion 213b may be a phase-lead compensation unit that performs phase-lead compensation in which a zero point becomes the above-described frequency fc. The yaw rate adjustment portion 213b outputs a value of a band equal to or more than the frequency fc in the yaw rate target value $\gamma_{r1}$ input from the yaw rate linearization phase compensation unit 213a as a yaw rate target value $\gamma_{r2}$. In the present example embodiment, the yaw rate adjustment portion 213b adjusts the yaw rate command torque $T_\gamma$ according to the frequency f by adjusting the yaw rate target value $\gamma_{r1}$ according to the frequency f.

In the present example embodiment, when a transfer function of the yaw rate adjustment portion 213b is $C_\gamma(s)$, a transfer function of the lateral displacement adjustment portion 214b is $C_y(s)$, and a constant of about one is $K_{yy}$, $C_\gamma(s)=K_{yy}-C_y(s)$ is satisfied. In the present description, that "the constant $K_{yy}$ is about one" includes not only a case where the constant $K_{yy}$ is strictly one but also a case where the constant $K_{yy}$ is 0.8 or more and 1.2 or less. The transfer function $C_\gamma(s)$ of the yaw rate adjustment portion 213b and the transfer function $C_y(s)$ of the lateral displacement adjustment portion 214*b* are substantially complementary to each other.

For example, in a case where the lateral displacement adjustment portion 214*b* is a phase delay compensation unit, the transfer function $C_y(s)$ of the lateral displacement adjustment portion 214*b* is expressed by, for example, Formula (5) below.

[Mathematical formula 5]

$$C_y(s) = K_r \frac{f_1}{f_1 + f_2} \frac{\frac{1}{2\pi f_1}s + 1}{\frac{1}{2\pi f_2}s + 1} \tag{5}$$

where s is a Laplace transformer, $f_1$ is a frequency [Hz] of a zero point of the transfer function $C_y(s)$, $f_2$ is a frequency [Hz] of a pole of the transfer function $C_y(s)$, and $K_r$ is a parameter for adjusting weighting of lateral displacement control and yaw rate control. A graph in which a gain (or loop gain) is set as the vertical axis and a logarithm of a frequency is set as the horizontal axis is referred to as a gain diagram. In the gain diagram, a zero point means an intersection of a gain curve and the horizontal axis indicating 0 dB, and a pole means a maximum point of the gain curve. For example, by setting a frequency of a pole to be higher than a frequency of a zero point, phase-lead compensation can be applied. The larger an interval between a frequency of a pole and a frequency of a zero point, the larger a phase-lead amount.

Weighting of lateral displacement control and yaw rate control can be adjusted by adjustment of the parameter $K_r$ within a range of $0 \leq K_r \leq (f_1 + f_2)/f_2$. In a case where the transfer function $C_y(s)$ of the lateral displacement adjustment portion 214*b* is expressed by Formula (5) above and $K_r$ is one, the transfer function $C_\gamma(s)$ of the yaw rate adjustment portion 213*b* is expressed by Formula (6) below.

[Mathematical formula 6]

$$C_\gamma(s) = \frac{f_2}{f_1 + f_2} \frac{\frac{1}{2\pi \frac{f_2^2}{f_1}}s + 1}{\frac{1}{2\pi f_2}s + 1} \tag{6}$$

As illustrated in FIG. 10, the yaw rate target value $\gamma_{r2}$ output from the yaw rate adjustment portion 213*b*, the traveling speed $V_v$ of the vehicle V, and the curvature $C_p$ of the target path $R_t(x)$ at the coordinates $(x_{k+1}, y_{k+1})$ are input to the yaw rate phase adjustment portion 213*c*. The yaw rate phase adjustment portion 213*c* adjusts a phase of the yaw rate target value $\gamma_r$ output from the yaw rate adjustment portion 213*b*. A transfer function $C_{\gamma p}(s)$ of the yaw rate phase adjustment portion 213*c* includes a transfer function by which the parameter $f_n$ corresponding to the natural frequency $f_\gamma$ of the yaw rate $\gamma$ in a transfer function $P_{nv}(s)$ of a second nominal model NM2 to be described later can be converted into a different parameter. In the present example embodiment, the transfer function $C_{\gamma p}(s)$ of the yaw rate phase adjustment portion 213*c* includes a transfer function by which the parameter $f_n$ corresponding to the natural frequency $f_\gamma$ of the yaw rate $\gamma$ in a transfer function $P_{nv}(s)$ of the second nominal model NM2 can be converted into a different parameter. The transfer function $C_{\gamma p}(S)$ of the yaw rate phase adjustment portion 213*c* is expressed by, for example, Formula (7) below.

[Mathematical formula 7]

$$C_{\gamma p}(s) = \frac{\frac{1}{2\pi f_n}s + 1}{\frac{1}{2\pi f_r}s + 1} \tag{7}$$

where, s is a Laplace transformer, $f_n$ is a parameter corresponding to the natural frequency $f_\gamma$ of the yaw rate $\gamma$, and $f_r$ is a value desired as a parameter corresponding to the natural frequency $f_\gamma$ of the yaw rate $\gamma$.

As illustrated in FIG. 10, the yaw rate phase adjustment portion 213*c* adjusts the yaw rate target value $\gamma_{r2}$ by the transfer function $C_{\gamma p}(s)$ and outputs the value as a yaw rate target value $\gamma r3$ to the torque conversion unit 213*d*. The torque conversion unit 213*d* converts the yaw rate target value $\gamma_{r3}$ into the yaw rate command torque $T_\gamma$. As described above, in the present example embodiment, since a relationship between the steering torque $T_h$ and the yaw rate $\gamma$ can be $T_h = G\gamma$, a gain of the torque conversion unit 213*d* is a proportional constant G.

Note that the yaw rate adjustment portion 213*b* indirectly adjusts the yaw rate command torque $T_\gamma$ according to the frequency f by adjusting the yaw rate target value $\gamma_{r1}$ according to the frequency f, but the present disclosure is not limited to this. The yaw rate adjustment portion 213*b* may be provided after the torque conversion unit 213*d* and directly adjust the yaw rate command torque $T_\gamma$ output from the torque conversion unit 213*d* according to the frequency f.

As illustrated in FIG. 7, the yaw rate command torque $T_\gamma$ output from yaw rate controller 213 and the lateral displacement command torque $T_y$ output from the lateral displacement controller 214 are added together in the adder AD2 and output as the first command torque $T_{LKA}$. As illustrated in FIG. 4, the first command torque $T_{LKA}$ output from the first assist controller 210 is input to the first gain adjustment portion 610.

The first gain adjustment portion 610 adjusts a gain of the first command torque $T_{LKA}$. The first gain adjustment portion 610 multiplies the first command torque $T_{LKA}$ by a first gain $K_1$ and outputs the obtained value as a first command torque $T_{LKA1}$. The first gain $K_1$ is a variable value. The first gain $K_1$ is expressed by $K_1 = 1 - K_2$ by using a second gain $K_2$ of the second gain adjustment portion 620. The first command torque $T_{LKA1}$ is input to the adder AD5 and the vehicle stabilization controller 240.

The steering angle $\theta_h$ detected based on the steering angle sensor 542 is input to the subtractor SU1. The subtractor SU1 subtracts the steering angle $\theta_s$ detected based on the steering torque sensor 541 and the steering angle sensor 542 from the steering angle $\theta_h$, and outputs the steering angle $\theta_s$ to the torque conversion unit 223.

A value output from the subtractor SU1 is input to the torque conversion unit 223. The torque conversion unit 223 multiplies a value output from the subtractor SU1 by a gain and outputs the steering torque $T_h$. A gain in the torque conversion unit 223 is equal to the spring constant $K_{tor}$ of the torsion bar 546. A value obtained by multiplying a difference between the steering angle $\theta_h$ and the steering angle $\theta_s$ by the spring constant $K_{tor}$ of the torsion bar 546 is a torsion bar torque, that is, the steering torque $T_h$. The steering torque $T_h$ is input to the second gain adjustment portion 620.

The second gain adjustment portion 620 adjusts a gain of the steering torque $T_h$. The second gain adjustment portion 620 multiplies the steering torque $T_h$ by the second gain $K_2$ and outputs the obtained value as a steering torque $T_{h1}$. The second gain $K_2$ is 0 or more and 1 or less. The second gain $K_2$ is a variable value that changes depending on a value of the steering torque $T_h$. From a relationship of $K_1=1-K_2$ described above, the first gain $K_1$ is zero in a case where the second gain $K_2$ is one, the first gain $K_1$ is 0.5 when the second gain K is 0.5, and the first gain $K_1$ is one when the second gain $K_2$ is zero. The larger the value of the second gain $K_2$, the greater the influence of the steering torque $T_h$ input by a steering person via the steering wheel 521, and the larger the value of the first gain $K_1$, the greater the influence of the first command torque $T_{LKA}$ output from the first assist controller 210. The first gain $K_1$ in a case where the first assist controller 210 executes lane keeping control is larger than the first gain $K_1$ in a case where the first assist controller 210 does not execute the lane keeping control. The steering torque $T_{h1}$ output from the second gain adjustment portion 620 is input to the adder AD5. The adder AD5 adds the first command torque $T_{LKA1}$ to the steering torque $T_h$ and outputs the obtained value to the second assist controller 220.

Figure 11:
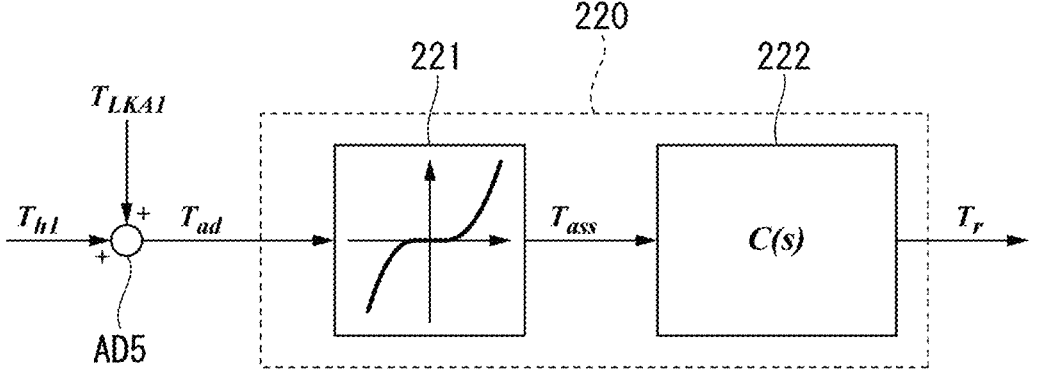
FIG. 11 is a block diagram illustrating a configuration of a second assist controller according to the first example embodiment.

The second assist controller 220 generates the second command torque $T_r$ input to the vehicle stabilization controller 240 based on a steering input value input from the steering wheel 521 of the vehicle V. In the present example embodiment, the steering input value is the steering torque $T_h$. In the present example embodiment, the second command torque $T_r$ is a "second input value" generated by the second assist controller 220. The second assist controller 220 generates the second command torque $T_r$ and controls a torque of the motor 543 to control reaction force transmitted from the steering wheel 521 to a steering person. As illustrated in FIG. 11, the second assist controller 220 includes a base assist controller 221 and a phase compensator 222.

The base assist controller 221 generates an assist torque $T_{ass}$ for compensating at least a part of a self-aligning torque $T_{SAT}$ generated in the tires 529A and 529B of a vehicle based on a torsion bar torque generated in the torsion bar 546, that is, the input torque $T_{ad}$ calculated based on the steering torque $T_h$. In the present example embodiment, the base assist controller 221 generates the assist torque $T_{ass}$ based on the input torque $T_{ad}$ calculated by adding the steering torque $T_{h1}$ obtained by multiplying the steering torque $T_h$ by the second gain $K_2$ and the first command torque $T_{LKA1}$ obtained by multiplying the first command torque $T_{LKA}$ by the first gain $K_1$.

Figure 12:
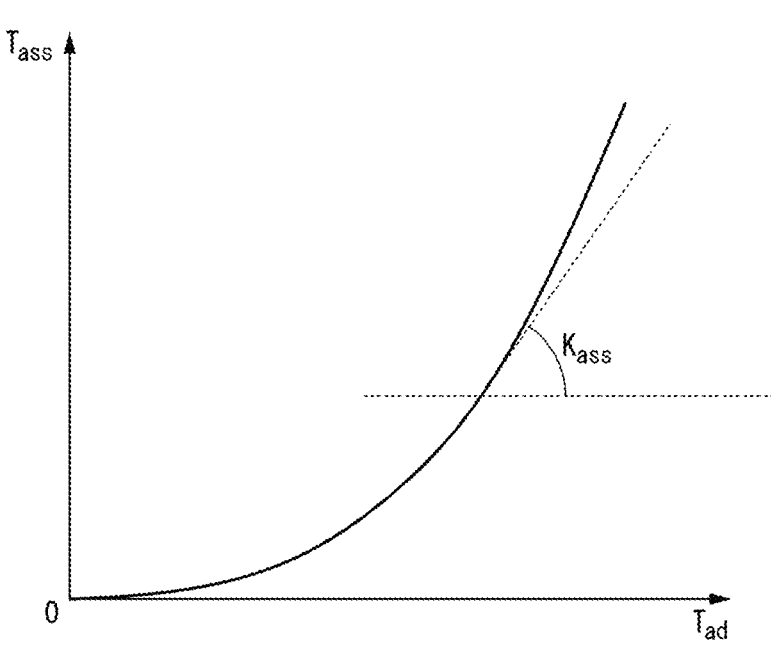
FIG. 12 is a graph illustrating an example of a relationship between an input torque and an assist torque according to the first example embodiment.

In the present example embodiment, the base assist controller 221 outputs the assist torque $T_{ass}$ by multiplying the input torque $T_{ad}$ by an assist gain $K_{ass}$. FIG. 12 illustrates an example of a relationship between the input torque $T_{ad}$ and the assist torque $T_{ass}$. In the graph of FIG. 12, the horizontal axis represents the input torque $T_{ad}$, the vertical axis represents the assist torque $T_{ass}$, and an inclination of the assist torque $T_{ass}$ with respect to the input torque $T_{ad}$ is the assist gain $K_{ass}$. The input torque $T_{ad}$, the assist torque $T_{ass}$, and the assist gain $K_{ass}$ satisfy a relationship of $dT_{ass}/dT_{ad}=K_{ass}$. As illustrated in FIG. 12, the assist torque $T_{ass}$ increases exponentially as the input torque $T_{ad}$ increases, for example. As illustrated in FIG. 11, the assist torque $T_{ass}$ output from the base assist controller 221 is input to the phase compensator 222.

Note that the base assist controller 221 may generate the assist torque $T_{ass}$ based on the input torque $T_{ad}$ and the traveling speed $V_v$ of the vehicle V. The base assist controller 221 may include, for example, a lookup table (LUT) in which a relationship between the input torque $T_{ad}$, the traveling speed $V_v$, and the assist torque $T_{ass}$ is defined, and determine the assist torque $T_{ass}$ with reference to the lookup table.

The phase compensator 222 in the present example embodiment adjusts a gain within a range that a steering frequency can take when a steering person operates the steering wheel 521, and compensates for rigidity of the torsion bar 546. The range that a steering frequency can take is, for example, 5 Hz or less. The phase compensator 222 may apply, for example, first-order phase compensation to the assist torque $T_{ass}$ when a steering frequency is 5 Hz or less. The first-order phase compensation is expressed by, for example, a transfer function $C(s)$ of Formula (8).

[Mathematical formula 8]

$$C(s) = \frac{\dfrac{1}{2\pi f_3}s + 1}{\dfrac{1}{2\pi f_4}s + 1} \tag{8}$$

where s is a Laplace transformer, $f_3$ is a frequency [Hz] of a zero point of the transfer function $C(s)$, and $f_4$ is a frequency [Hz] of a pole of the transfer function $C(s)$.

The phase compensator 222 generates the second command torque $T_r$ based on the assist torque $T_{ass}$ output from the base assist controller 221 and a gain of the phase compensator 222. That is, the second command torque $T_r$, which is a second input value, is calculated based on the assist torque $T_{ass}$. For example, the phase compensator 222 is a stabilization compensator and can apply stability phase compensation to the assist torque $T_{ass}$. The phase compensator 222 may have a second-order or higher transfer function whose frequency characteristic is variable according to the transfer function $C(s)$. The second-order or higher transfer function is expressed using a parameter of responsiveness and a parameter of a damping ratio (damping). The second-order or higher transfer function $C(s)$ can be expressed by, for example, Formula (9). By setting the order number of the transfer function $C(s)$ to the second order, damping can be given to a characteristic of the transfer function $C(s)$. A phase characteristic can be adjusted by changing damping.

[Mathematical formula 9]

$$C(s) = \frac{s^2 + 2\zeta_3\omega_3 s + \omega_3^2}{s^2 + 2\zeta_4\omega_4 s + \omega_4^2}\left(\frac{\omega_4^2}{\omega_3^2}\right) \tag{9}$$

In Formula (9), s is a Laplace transformer, $\omega_3$ is a frequency of a zero point of the transfer function $C(s)$, $\omega_4$ is a frequency of a pole of the transfer function $C(s)$, $\zeta_3$ is a damping ratio of the zero point, and $\zeta_4$ is a damping ratio of the pole. The frequency $\omega_4$ of a pole is lower than the frequency $\omega_3$ of a zero point.

Figure 13:
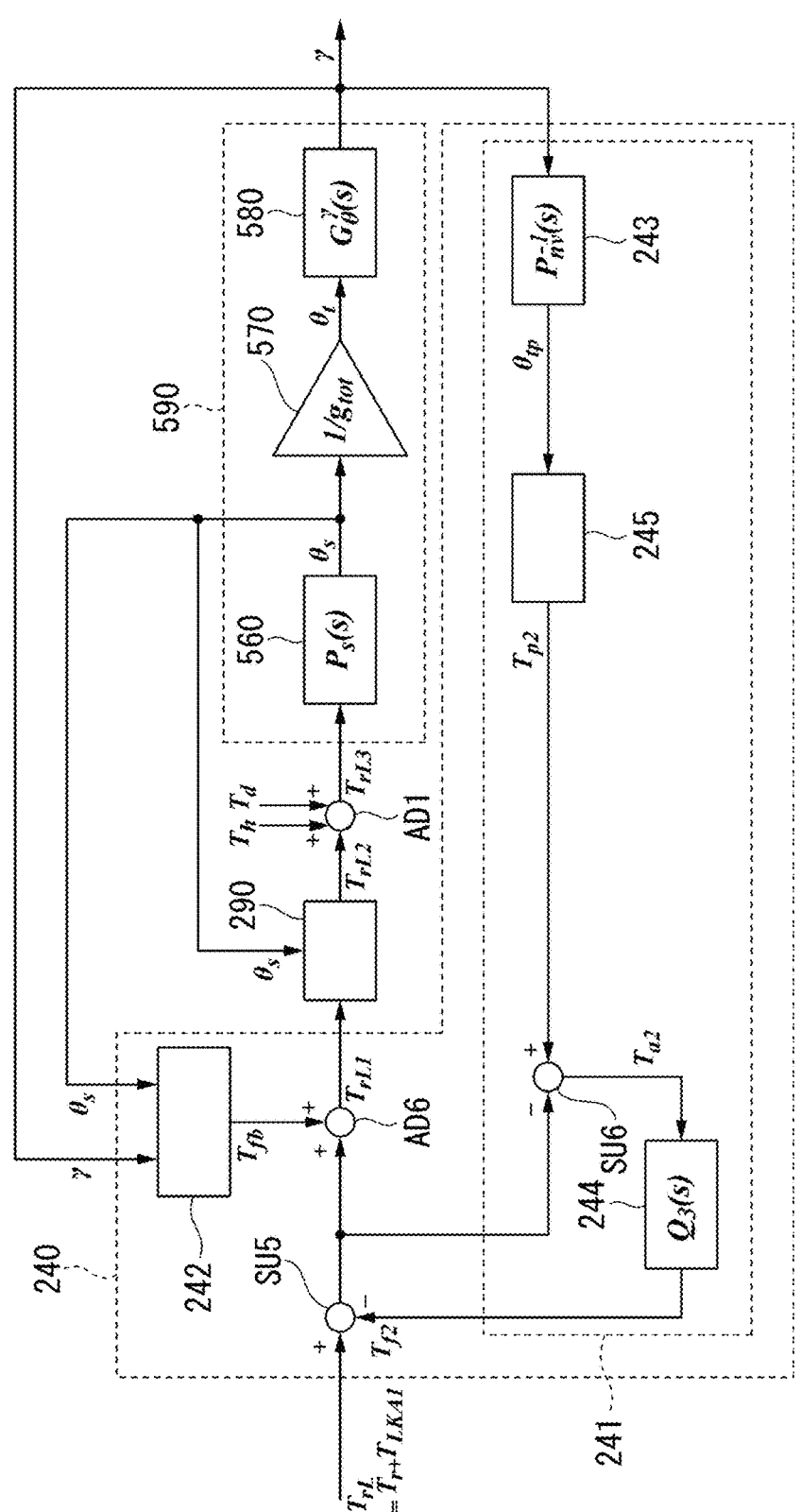
FIG. 13 is a block diagram illustrating a configuration of a vehicle stabilization controller in the first example embodiment.

As illustrated in FIG. 4, the first command torque $T_{LKA1}$ output from the first gain adjustment portion 610 and the second command torque $T_r$ output from the second assist controller 220 are input to the vehicle stabilization controller 240. As illustrated in FIG. 13, the vehicle stabilization controller 240 includes a second model following controller 241, a second state feedback unit 242, a subtractor SU5, and an adder AD6.

The subtractor SU5 receives a command torque $T_{rL1}$ obtained by adding the first command torque $T_{LKA1}$ and the second command torque $T_r$. The subtractor SU5 subtracts a second correction torque $T_{f2}$ output from the second model following controller 241 from the input command torque $T_r$. Output from the subtractor SU5 is input to the adder AD6 and the second model following controller 241. The adder AD6 outputs a command torque $T_{rL1}$, which is a value obtained by adding output from the second state feedback unit 242 to output from the subtractor SU5, to the disturbance sensitivity controller 290. In the present example embodiment, the command torque $T_{rL1}$ is a "command value" calculated based on the first command torque $T_{LKA1}$ multiplied by the first gain $K_1$ and the second command torque $T_r$ multiplied by the second gain $K_2$.

In the present example embodiment, the second model following controller 241 is a model following controller configured to perform model following control. The second model following controller 241 generates the second correction torque $T_{f2}$ for correcting the command torque $T_r$ based on the yaw rate $\gamma$ and the second nominal model NM2. In the present example embodiment, the second correction torque $T_{f2}$ is a feedback torque fed back to the command torque $T_{rL}$. The second nominal model NM2 is an internal model used as a model that restricts a second control target 580 when the second control target 580 is controlled. In the present example embodiment, the second control target 580 is a plant model that receives input of an actual steering angle $\theta_t$ of the tires 529A and 529B and outputs the yaw rate $\gamma$. As illustrated in FIG. 6, the actual steering angle $\theta_t$ is an angle at which the tires 529A and 529B are inclined in the left-right direction of a vehicle body of the vehicle V with respect to a front-rear direction of the vehicle body when viewed in the vertical direction. The second control target 580 illustrated in FIG. 13 is the vehicle V. A transfer function $G_\theta{}^\gamma(s)$ of the second control target 580 is determined by a characteristic of the vehicle V.

In the present example embodiment, the second model following controller 241 generates the second correction torque $T_{f2}$ based on the yaw rate $\gamma$ and feeds back the second correction torque $T_{f2}$ to the command torque Tri. The second model following controller 241 includes a second inverse nominal model 243, a filter 244, a torque conversion unit 245, and a subtractor SU6.

The second model following controller 241 is configured such that a transfer function of the second control target 580 is restricted to the transfer function $P_{nv}(s)$ of the second nominal model NM2 in a frequency band in which a gain in a gain characteristic of a complementary sensitivity function with respect to a modeling error between the second control target 580 as a plant model and the second nominal model NM2 is one or substantially one.

In the present description, that "a transfer function of a certain control target is restricted to a transfer function of a certain nominal model" means that, for example, a control target is controlled such that a transfer function of the certain control target appears to be a transfer function of the certain nominal model apparently when an input and output relationship is viewed. Further, in the present description, that "a certain gain is approximately one" includes, for example, a case where the certain gain is 0.8 or more and 1.2 or less in addition to a case where the certain gain is one. The numerical range is, for example, a range in which a gain of a substantial disturbance reduction characteristic can be adjusted to one in consideration of positive efficiency and reverse efficiency of a worm gear in a case where the deceleration mechanism 544 connected to the motor 543 includes the worm gear. Since efficiency of a worm gear is about 0.8, it is necessary to adjust a gain by ±0.2 with respect to a target value of one.

A complementary sensitivity function for a modeling error between the second control target 580 and the second nominal model NM2 is a complementary sensitivity function of an inner loop including the second model following controller 241. In the present example embodiment, the complementary sensitivity function in the second model following controller 241 is equal to a transfer function $Q_3(s)$ of the filter 244. The transfer function $Q_3(s)$, which is a complementary sensitivity function, has a gain of substantially 0 dB, that is, a gain in a transfer function is one or substantially one, for example, in a frequency band that the filter 244 allows to pass through. That is, in the present example embodiment, the second model following controller 241 is configured such that the transfer function $G_\theta{}^\gamma(s)$ of the second control target 580 is restricted by the transfer function $P_{nv}(S)$ of the second nominal model NM2 in a frequency band in which a gain in a gain characteristic of the transfer function $Q_3(s)$ is one or substantially one. As described above, the vehicle stabilization controller 240 restricts the transfer function $G_\theta{}^\gamma(s)$ of the second control target 580, which is the plant model, to the predetermined transfer function $P_{nv}(s)$ of the second nominal model NM2 by model following control performed by the second model following controller 241.

The second inverse nominal model 243 is an inverse model of the second nominal model NM2 used to restrict the second control target 580. The transfer function $P_{nv}(s)$ of the second nominal model NM2 is expressed by, for example, Formula (10) below. A transfer function $P_{nv}{}^{-1}(s)$ of the second inverse nominal model 243 is expressed by Formula (11) below.

[Mathematical formula 10]

$$P_{nv}(s) = \frac{G_\theta^\gamma(0)}{\dfrac{1}{2\pi f_n}s + 1} \tag{10}$$

[Mathematical formula 11]

$$P_{nv}^{-1}(s) = \frac{1}{G_\theta^\gamma(0)}\left(\frac{1}{2\pi f_n}s + 1\right) \tag{11}$$

where, s is a Laplace transformer, $f_n$ is a parameter corresponding to the natural frequency $f_\gamma$ of the yaw rate $\gamma$, and $G_\theta{}^\gamma(0)$ is a stationary gain of a transfer function from the actual steering angle $\theta_t$ of the tires 529A and 529B of the vehicle V to the yaw rate $\gamma$.

Figure 14:
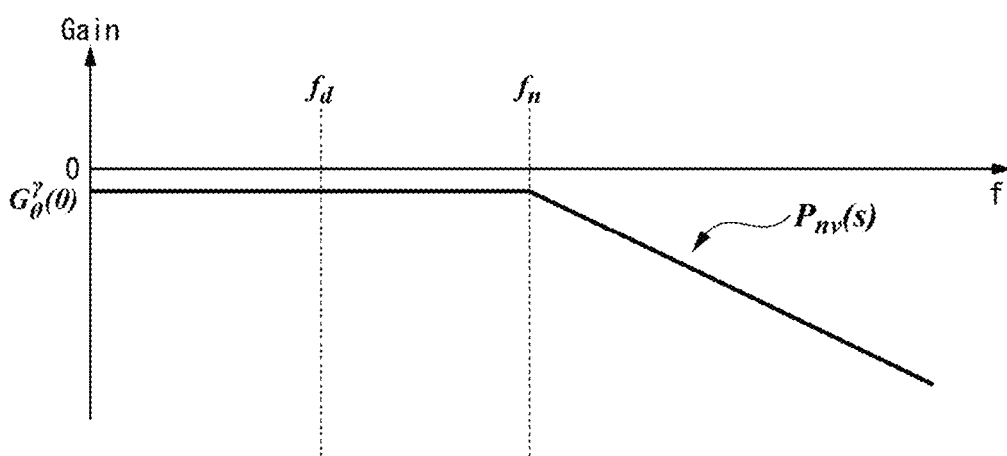
FIG. 14 is a Bode diagram illustrating a gain of a transfer function of a second nominal model according to the first example embodiment.

A gain in the transfer function $P_{nv}(s)$ of the second nominal model NM2 is expressed, for example, as illustrated in FIG. 14. As illustrated in FIG. 14, a gain in the transfer function $P_{nv}(s)$ of the second nominal model NM2 becomes the stationary gain $G_\theta{}^\gamma(0)$ in a frequency band equal to or less than the parameter $f_n$ corresponding to the natural frequency $f_\gamma$ of the yaw rate $\gamma$, and decreases in a frequency band higher than the parameter $f_r$. As described above, by reducing a gain in a frequency band equal to or more than the predetermined frequency $f_d$ in the yaw rate target value $\gamma_r$ in the yaw rate linearization phase compensation unit 213a, the second control target 580 can be controlled in a region where a gain in the transfer function $P_{nv}(s)$ of the second nominal model NM2 becomes the stationary gain $G_\theta{}^\gamma(0)$.

Output of the second control target 580, that is, the yaw rate γ is input to the second inverse nominal model 243. The second inverse nominal model 243 outputs a steering angle $\theta_{tp}$ based on Formula (11) above and the input yaw rate γ. The steering angle $\theta_{tp}$ is equal to a value of the actual steering angle $\theta_t$ input to the second nominal model NM2 in a case where an output value of the second nominal model NM2 is the same value as an output value of the second control target 580. The steering angle $\theta_{tp}$ is input to the torque conversion unit 245. The torque conversion unit 245 converts the steering angle $\theta_{tp}$ into a torque $T_{p2}$ and outputs torque $T_{p2}$.

The subtractor SU6 subtracts output of the subtractor SU5 from output of the torque conversion unit 245 to generate a differential torque Tac. The differential torque $T_{a2}$ output from the subtractor SU6 is input to the filter 244. The filter 244 performs filter processing on the differential torque $T_{a2}$ to obtain the second correction torque $T_{f2}$, and outputs the second correction torque $T_{f2}$ to the subtractor SU5.

The second model following controller 241 restricts the second control target 580 to the second nominal model NM2, so that the natural frequency $f_\gamma$ of the yaw rate γ can be restricted to the parameter $f_n$ in the transfer function $P_{nv}(s)$ of the second nominal model NM2. In the present example embodiment, the transfer function $C_{\gamma p}(s)$ of the yaw rate phase adjustment portion 213c is expressed by Formula (7) described above, so that a denominator in the transfer function $P_{nv}(s)$ of the second nominal model NM2 can be canceled by a numerator of the transfer function $C_{\gamma p}(s)$ and replaced with a denominator of the transfer function $C_{\gamma p}(s)$. By the above, a value of the parameter $f_n$ can be converted into the parameter $f_r$ in Formula (7). Therefore, the parameter $f_r$ corresponding to the natural frequency $f_\gamma$ of the yaw rate γ in the transfer function $P_{nv}(s)$ of the second nominal model NM2 can be converted into a desired different value by the transfer function $C_{\gamma p}(s)$ of the yaw rate phase adjustment portion 213c. The parameter $f_r$ corresponding to the natural frequency $f_\gamma$ of the desired yaw rate γ is adjusted according to the curvature $C_p$, for example. For example, when the curvature $C_p$ is small, the parameter $f_r$ is made large, and when the curvature $C_p$ is large, the parameter $f_r$ is made small. The parameter $f_r$ is preferably about 2 Hz or more and 4 Hz or less.

In a case of not being restricted to the parameter $f_n$ by the second model following controller 241, the natural frequency $f_\gamma$ of the yaw rate γ is, for example, about 1 Hz or more and 1.5 Hz or less. As the natural frequency $f_\gamma$ of the yaw rate γ is restricted to the parameter $f_r$ by the second model following controller 241, the natural frequency $f_\gamma$ of the yaw rate γ can be made high, and resonance of the yaw rate γ can be made less likely to occur. By the above, traveling of the vehicle V can be further stabilized.

Figure 15:
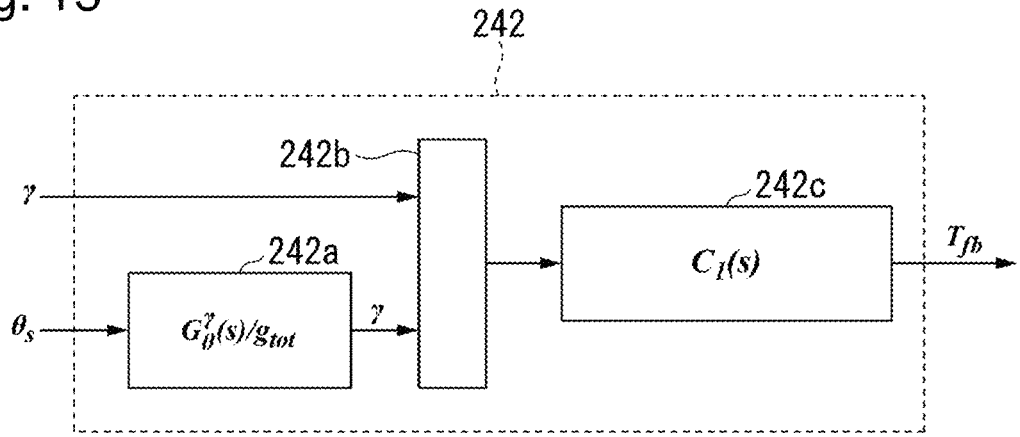
FIG. 15 is a block diagram illustrating a configuration of a second state feedback unit according to the first example embodiment.

The second state feedback unit 242 outputs a state feedback torque Tb for approximating a characteristic of the vehicle V to a transfer function with a primary delay based on the yaw rate γ or the steering angle $\theta_s$ of the vehicle V. As illustrated in FIG. 15, the second state feedback unit 242 includes a yaw rate conversion unit 242a, a switch unit 242b, and a torque conversion unit 242c. The switch unit 242b switches which one of the yaw rate γ and the steering angle $\theta_s$ of the vehicle V is used to calculate the state feedback torque $T_{fb}$. In a case where there is a signal from the imaging device 400, the switch unit 242b outputs the yaw rate γ calculated based on the imaging device 400 to the torque conversion unit 242c. In a case where there is no signal from the imaging device 400, the switch unit 242b outputs the yaw rate γ calculated based on the steering angle $\theta_s$ to the torque conversion unit 242c. The yaw rate conversion unit 242a converts the input steering angle $\theta_s$ into the yaw rate γ and outputs the yaw rate γ to the switch unit 242b. A transfer function of the yaw rate conversion unit 242a is expressed by $G_\theta^\gamma(s)/g_{tot}$. $G_\theta^\gamma(s)$ is a transfer characteristic from the actual steering angle θt to the yaw rate γ, and is a transfer function of the second control target 580. A conversion gain $1/g_{tot}$ is a conversion gain from the steering angle $\theta_s$ to the actual steering angle $\theta_r$. The parameter $g_{tot}$ is a parameter corresponding to a gear ratio from the steering angle $\theta_s$ to the actual steering angle $\theta_r$.

The torque conversion unit 242c converts the yaw rate γ input from the switch unit 242b into the state feedback torque $T_{fb}$ and outputs the state feedback torque $T_{fb}$. A transfer function $C_1(s)$ of the torque conversion unit 242c is expressed by Formula (12) below.

[Mathematical formula 12]

$$C_1(s) = \frac{1}{G_\theta^\gamma(0)} \frac{\tau_n K_d s}{C_r V_v s + 1} \tag{12}$$

Here, s is a Laplace transformer, and $G_\theta^\gamma(0)$, $C_r$, and $\tau_n$ are constant values determined by specifications of the vehicle V. $G_\theta^\gamma(0)$, $C_r$, and $\tau_n$ are determined based on, for example, the traveling speed $V_v$, a wheelbase, cornering forces of the tires 529A and 529B, yaw moment of the vehicle V, and the like. $G_\theta^\gamma(0)$ is a stationary gain of a transfer function from the actual steering angle $\theta_t$ of the tires 529A and 529B of the vehicle V to the yaw rate γ.

As illustrated in FIG. 13, the state feedback torque $T_{fb}$ output from the second state feedback unit 242 is input to the adder AD6 and added to output from the subtractor SU5. The adder AD6 adds the state feedback torque $T_{fb}$ to output from the subtractor SU5 to obtain the command torque Tri, and outputs the command torque $T_{rL1}$ to the disturbance sensitivity controller 290.

The transfer function of the second control target 580 described above, that is, the transfer function $G_\theta^\gamma(s)$ of a characteristic of the vehicle V is expressed by Formula (13) below.

[Mathematical formula 13]

$$\frac{\gamma}{\theta_t} = G_\theta^\gamma(s) = G_\theta^\gamma(0) \frac{1 + T_g s}{1 + \frac{2\xi}{\omega_n} s + \frac{s^2}{\omega_n^2}} \tag{13}$$

where, s is a Laplace transformer, $\omega_n$ is a parameter of responsiveness, ξ is a parameter of a damping ratio (damping), $G_\theta^\gamma(0)$ is a constant determined from specifications of the vehicle V, and $T_g$ is a constant determined from specifications of the vehicle V and the traveling speed $V_v$ of the vehicle V.

The second state feedback unit 242 feeds back the state feedback torque $T_{fb}$ calculated by multiplying a state feedback gain $K_d$, so that the parameter ξ of a damping ratio in Formula (13) above can be controlled. When the parameter ξ of a damping ratio is set to one by the second state feedback unit 242, the right term of Formula (13) described above can be approximated by a transfer function with a primary delay as in Formula (14) below.

[Mathematical formula 14]

$$G_\theta^\gamma(0) \frac{1 + T_g s}{1 + \frac{2\xi}{\omega_n}s + \frac{s^2}{\omega_n^2}} \sim \frac{G_\theta^\gamma(0)}{\frac{1}{2\pi f_\gamma}s + 1} \quad (14)$$

where, $f_\gamma$ is a natural frequency of the yaw rate $\gamma$.

Since a transfer function of the second control target 580 can be approximated as in Formula (14) above, the second control target 580 can be easily restricted to the second nominal model NM2 having the transfer function $P_{nv}(s)$ shown in Formula (10) above. Further, since the second nominal model NM2 can be expressed by a transfer function with a primary delay as in Formula (10), if a plant characteristic of the second control target 580 changes due to a change in the number of passengers of the vehicle V or the like, the natural frequency $f_\gamma$ of the yaw rate $\gamma$ can be restricted to the desired parameter $f_r$ by the second nominal model NM2. As described above, in the present example embodiment, a characteristic of the vehicle V that is stable and easy to steer can be realized by combination of state feedback by the second state feedback unit 242 and model following control by the second model following controller 241.

For example, in a case where a modeling error between the second control target 580 and the second nominal model NM2 is large only by changing the natural frequency $f_\gamma$ of the yaw rate $\gamma$ by restriction of the second control target 580 to the second nominal model NM2 by model following control, there is a case where robust stability is lowered, and the natural frequency $f_\gamma$ of the yaw rate $\gamma$ cannot be adjusted to a desired characteristic. On the other hand, in the present example embodiment, by adjusting the state feedback gain $K_d$ of the second state feedback unit 242 in the vehicle stabilization controller 240 and linearly approximating the transfer function $G_\theta^\gamma(s)$ of the second control target 580 as described above, the transfer function $G_\theta^\gamma(s)$ of the second control target 580 can be brought close to the transfer function $P_{nv}(s)$ of the second nominal model NM2, and a modeling error can be reduced. By the above, the natural frequency $f_\gamma$ of the yaw rate $\gamma$ that is stable and desirable can be realized by performing model following control in the second model following controller 241. Note that a relationship between a modeling error and robust stability in model following control will be described in detail in model following control by a first model following controller 230 described later.

Figure 16:
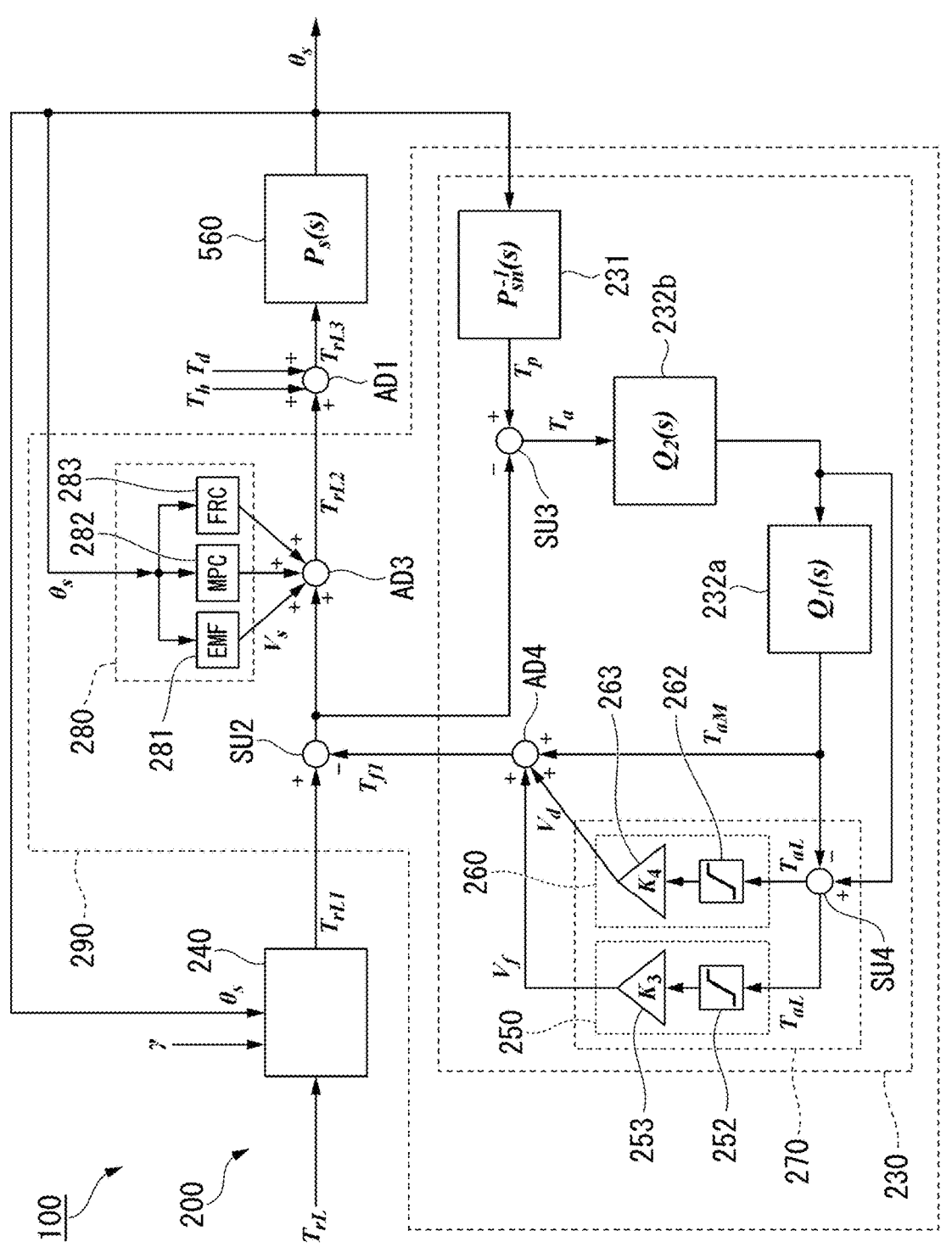
FIG. 16 is a block diagram illustrating a configuration of a disturbance sensitivity controller according to the first example embodiment.

As illustrated in FIG. 16, the command torque $T_{rL1}$ output from the vehicle stabilization controller 240 is input to the disturbance sensitivity controller 290. The disturbance sensitivity controller 290 includes s the first model following controller 230, a first state feedback unit 280, an adder AD3, and a subtractor SU2.

The first model following controller 230 generates a first correction torque $T_{h1}$ for correcting the command torque $T_{rL1}$ based on output of the first control target 560 including the motor 543 provided in the steering assembly 530 and a first nominal model NM1 based on a configuration of the first control target 560. In the present example embodiment, the first correction torque $T_{f1}$ is a "correction value" for correcting the command torque $T_{rL1}$ that is a command value. In a case where the command value is an angle, the correction value is an angle. The first correction torque $T_{f1}$ is a feedback torque fed back to the command torque $T_{rL1}$. The first nominal model NM1 is an internal model used as a model that restricts the first control target 560 when the first control target 560 is controlled. The first nominal model NM1 will be described in detail later. The first model following controller 230 is a model following controller configured to perform model following control. A specific configuration of the first model following controller 230 will be described in detail later.

The subtractor SU2 subtracts the first correction torque $T_{f1}$ output from the first model following controller 230 from the command torque $T_{rL1}$. Output from the subtractor SU2 is input to the adder AD3 and the first model following controller 230. The adder AD3 outputs a command torque Tris, which is a value obtained by adding output from the first state feedback unit 280 to output from the subtractor SU2, to the adder AD1. The adder AD1 outputs a command torque $T_{rL3}$, which is a value obtained by adding the steering torque $T_h$ and a disturbance torque $T_d$ to output from the adder AD3, to the first control target 560. The first control target 560 is a control target whose input is the command torque $T_{rL3}$ and whose output is the steering angle $\theta_s$. As illustrated in FIG. 13, the steering angle $\theta_s$ output from the first control target 560 is input to a conversion unit 570. The conversion unit 570 multiplies the steering angle $\theta_s$ by the conversion gain $1/g_{tot}$ to output the actual steering angle $\theta_t$. The actual steering angle $\theta t$ output from the conversion unit 570 is input to the second control target 580. Note that, in FIG. 4, the first control target 560, the conversion unit 570, and the second control target 580 are collectively illustrated as a control target block 590.

The disturbance torque $T_d$ is a difference between an actual output torque of the motor 543 and an ideal output torque of the motor 543. The disturbance torque $T_d$ includes a disturbance torque externally applied to the first control target 560. The disturbance torque $T_d$ includes, for example, an extra torque generated by friction and backlash due to mechanical elements such as the motor 543 and the deceleration mechanism 544, a torque ripple generated in the motor 543, the self-aligning torque $T_{SAT}$, and a disturbance torque that may be generated when traveling on an unpaved rattling road, a gravel road, or the like.

As illustrated in FIG. 16, in the present example embodiment, the first model following controller 230 generates the first correction torque $T_{f1}$ based on the steering angle $\theta_s$, and feeds back the first correction torque $T_{f1}$ to the command torque $T_{rL1}$. The first model following controller 230 includes a first inverse nominal model 231, a first filter 232$a$, a second filter 232$b$, an assist adjustment portion 270, a subtractor SU3, and an adder AD4. In the present example embodiment, the first filter 232$a$ is a high-pass filter. The first filter 232$a$ has a first cutoff frequency Cf1. The first cutoff frequency Cf1 is, for example, 2 Hz or more and 10 Hz or less. In the present example embodiment, the first cutoff frequency Cf1 is higher than 5 Hz and lower than 10 Hz.

In the present example embodiment, the second filter 232$b$ is a low-pass filter. The second filter 232$b$ has a second cutoff frequency Cf2 higher than the first cutoff frequency Cf1. The second cutoff frequency Cf2 is, for example, 3 Hz or more and 50 Hz or less. However, an upper limit of the second cutoff frequency Cf2 may be set in a range of about 140 Hz or more and 200 Hz or less. The order of the second filter 232$b$ is third order or more. The second filter 232$b$ may include, for example, a plurality of low-pass filters. The first filter 232$a$ and the second filter 232$b$ are coupled in series.

The first model following controller 230 is configured such that a transfer function $P_s(s)$ of the first control target 560 is restricted to a transfer function $P_{sn}(s)$ of the first nominal model NM1 in a frequency band in which a complementary sensitivity gain GT which is a gain in a gain characteristic of a complementary sensitivity function T(s) with respect to a modeling error between the first control target 560 and the first nominal model NM1 is one or substantially one.

Figure 17:
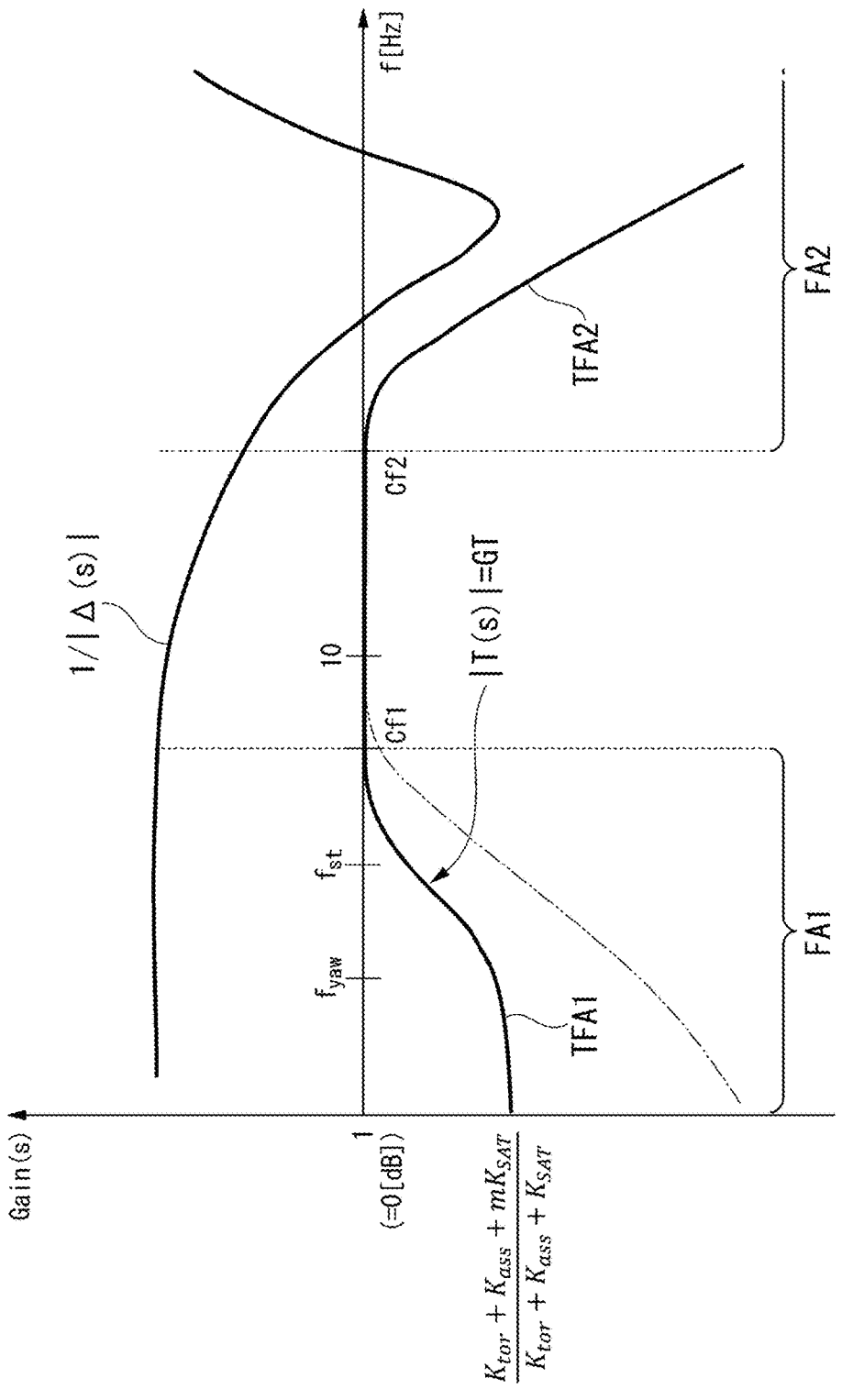
FIG. 17 is a graph exemplifying a gain characteristic of a complementary sensitivity function of a first model following controller according to the first example embodiment and a gain characteristic of a reciprocal of a modeling error between a transfer function of a first control target and a transfer function of a first nominal model.

The complementary sensitivity function T(s) is a complementary sensitivity function of an inner loop including the first model following controller 230. FIG. 17 illustrates the complementary sensitivity gain GT in the complementary sensitivity function T(s). The complementary sensitivity gain GT is a gain of a complementary sensitivity function T(s) as a transfer function, and is an absolute value of the complementary sensitivity function T(s). As illustrated in FIG. 17, the complementary sensitivity function T(s) has a gain of 0 dB, that is, the complementary sensitivity gain GT of one in a transfer function in a frequency band where the frequency f is the first cutoff frequency Cf1 or more and the second cutoff frequency Cf2 or less. That is, the first cutoff frequency Cf1 is a lower limit value of a frequency band in which the complementary sensitivity gain GT is one. The second cutoff frequency Cf2 is an upper limit value of a frequency band in which the complementary sensitivity gain GT is one.

The transfer function $P_s(s)$ of the first control target 560 is a plant characteristic for which model following control is performed. The transfer function $P_s(s)$ of the first control target 560 is expressed by, for example, Formula (15) below.

Figure 18:
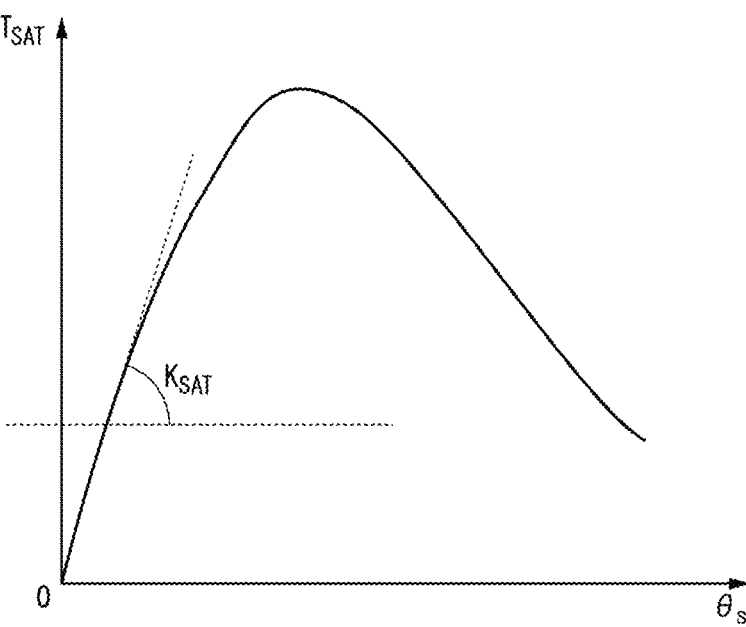
FIG. 18 is a graph illustrating an example of a relationship between a steering angle and a self-aligning torque according to an example embodiment of the present disclosure.

[Mathematical formula 15]

$$P_s(s) = \frac{1}{Js^2 + Bs + K_{SAT}} \tag{15}$$

where s is a Laplace transformer, J is a parameter representing the moment of inertia of the steering assembly unit 520, and B is a parameter representing a viscous friction coefficient of the steering assembly unit 520. $K_{SAT}$ is a self-aligning torque gain. The self-aligning torque gain $K_{SAT}$ is an inclination of the self-aligning torque $T_{SAT}$ generated in the tires 529A and 529B of the vehicle V with respect to the steering angle $\theta_s$. FIG. 18 illustrates an example of the relationship between the self-aligning torque $T_{SAT}$ and the steering angle $\theta_s$. In the graph of FIG. 18, the horizontal axis represents the steering angle $\theta_s$, the vertical axis represents the self-aligning torque $T_{SAT}$, and an inclination of the self-aligning torque $T_{SAT}$ with respect to the steering angle $\theta_s$ is the self-aligning torque gain $K_{SAT}$. The steering angle $\theta_s$, the self-aligning torque $T_{SAT}$, and the self-aligning torque gain $K_{SAT}$ satisfy the relationship of $dT_{SAT}/d\theta_s = K_{SAT}$. As illustrated in FIG. 18, for example, the self-aligning torque $T_{SAT}$ becomes larger as the steering angle $\theta_s$ becomes larger up to a certain degree of the steering angle $\theta_s$, and becomes smaller as the steering angle $\theta_s$ becomes larger when the steering angle $\theta_s$ becomes a certain degree or more.

The first inverse nominal model 231 is an inverse model of the first nominal model NM1 used to restrict the first control target 560. The transfer function $P_{sn}(s)$ of the first nominal model NM1 is expressed by, for example, Formula (16) below. A transfer function $P_{sn}^{-1}(s)$ of the first inverse nominal model 231 is expressed by, for example, Formula (17) below.

[Mathematical formula 16]

$$P_{sn}(s) = \frac{1}{J_n s^2 + B_n s} \tag{16}$$

-continued

[Mathematical formula 17]

$$P_{sn}^{-1}(s) = J_n s^2 + B_n s \tag{17}$$

In Formulas (16) and (17), s is a Laplace transformer, $J_n$ is a parameter representing the moment of inertia of the first nominal model NM1, and $B_n$ is a parameter representing a viscous friction coefficient of the first nominal model NM1. Note that the transfer function $P_{sn}(s)$ of the first nominal model NM1 and the transfer function $P_{sn}^{-1}(s)$ of the first inverse nominal model 231 are not limited to the examples illustrated in Formulas (16) and (17), and are not particularly limited.

As illustrated in FIG. 16, output of the first control target 560 is input to the first inverse nominal model 231. Specifically, the steering angle $\theta_s$ is input to the first inverse nominal model 231. The first inverse nominal model 231 outputs the torque $T_p$ based on Formula (17) described above and the input steering angle $\theta_s$. That is, the first model following controller 230 calculates the torque $T_p$ using the first nominal model NM1 based on output of the first control target 560. The torque $T_p$ is equal to a value of a torque input to the first nominal model NM1 in a case where an output value of the first nominal model NM1 is the same value as an output value of the first control target 560.

The subtractor SU3 subtracts output of the subtractor SU2 from output of the first inverse nominal model 231 to generate a differential torque Ta. That is, the subtractor SU3 subtracts, from the torque $T_p$, the command torque $T_{rL1}$ before a state compensation value $V_s$ described later is fed back after the first correction torque $T_{f1}$ is fed back, to generate the differential torque $T_a$. The differential torque $T_a$ is, for example, an estimated value of the disturbance torque $T_a$. The differential torque $T_a$ output from the subtractor SU3 is input to the second filter 232b and subjected to low-pass filter processing, and then input to the first filter 232a and subjected to high-pass filter processing. The differential torque $T_a$ subjected to filter processing by the first filter 232a and the second filter 232b is input to the adder AD4. The differential torque $T_a$ subjected to filter processing by the first filter 232a and the second filter 232b is in a state in which a frequency component lower than the first cutoff frequency Cf1 and a frequency component higher than the second cutoff frequency Cf2 are removed. That is, the differential torque $T_a$ subjected to filter processing by the first filter 232a and the second filter 232b is a frequency component $T_{aM}$ equal to or more than the first cutoff frequency Cf1 and equal to or less than the second cutoff frequency Cf2.

The adjustment portion 270 generates a assist compensation value for friction and disturbance and adjusts the differential torque $T_a$. In the present example embodiment, the assist adjustment portion 270 adjusts the frequency component $T_{aM}$ of the differential torque $T_a$. The assist adjustment portion 270 is coupled in parallel to the first filter 232a. The assist adjustment portion 270 includes a friction compensation value calculator 250, a disturbance compensation value calculator 260, and a subtractor SU4.

The subtractor SU4 subtracts an output value from the first filter 232a from an output value from the second filter 232b. Here, an output value from the second filter 232b is a value obtained by removing a frequency component higher than the second cutoff frequency Cf2 from the differential torque $T_a$. An output value from the first filter 232$a$ is a value obtained by removing a frequency component higher than the second cutoff frequency Cf2 and a frequency component lower than the first cutoff frequency Cf1 from the differential torque $T_a$. Therefore, a value output from the subtractor SU4 is a frequency component $T_{aL}$ lower than the first cutoff frequency Cf1 in the differential torque $T_a$. An output of the subtractor SU4 is input to the friction compensation value calculator 250 and the disturbance compensation value calculator 260. The frequency component $T_{aL}$ includes a frictional force, the self-aligning torque $T_{SAT}$, a disturbance torque caused by backlash of the first control target 560, a torque ripple generated in the first control target 560, and the like.

The friction compensation value calculator 250 calculates a friction compensation value $V_f$ that compensates at least a part of frictional force generated in the first control target 560 based on the differential torque $T_a$. As described above, a value from the subtractor SU4 input to the friction compensation value calculator 250 is the frequency component $T_{aL}$ lower than the first cutoff frequency Cf1 in the differential torque $T_a$. Therefore, in the present example embodiment, the friction compensation value calculator 250 calculates the friction compensation value $V_f$ based on a component having a frequency lower than the first cutoff frequency Cf1 in the differential torque $T_a$.

The friction compensation value calculator 250 includes a limiter 252 and a gain adjuster 253. The limiter 252 limits an output value from the subtractor SU4. The limiter 252 clips an input value to an upper or lower threshold in a case where the input value exceeds the upper or lower threshold. The gain adjuster 253 applies a gain $K_3$ to an output value from the limiter 252. The friction compensation value calculator 250 calculates the friction compensation value $V_f$ by applying a limit by the limiter 252 and the gain $K_3$ to a component of a frequency lower than the first cutoff frequency Cf1 in the differential torque $T_a$. A threshold of the limiter 252 and a value of the gain $K_3$ are determined in advance based on, for example, frictional force actually generated in the first control target 560.

The friction compensation value $V_f$ output from the friction compensation value calculator 250 is a value that compensates for at least a part of a frictional force component included in the frequency component $T_{aL}$ of the differential torque $T_a$. In general, since appropriate friction is required for the first control target 560, the friction compensation value calculator 250 calculates a value smaller than frictional force actually generated in the first control target 560 as the friction compensation value $V_f$. This makes it possible to achieve highly accurate friction compensation while maintaining appropriate frictional force on the first control target 560. A target of friction compensation using the friction compensation value $V_f$ is, for example, friction of the motor 543, friction of the deceleration mechanism 544, a difference between right and left in friction of the deceleration mechanism 544, and the like.

Here, the frequency component Tar of the differential torque $T_d$ includes, in addition to a frictional force component, the self-aligning torque $T_{SAT}$ generated in the first control target 560, a disturbance torque caused by backlash generated in the first control target 560, and a torque ripple generated in the first control target 560. For this reason, the friction compensation value $V_f$ obtained by processing of the frequency component $T_{aL}$ by the limiter 252 and the gain adjuster 253 also includes a compensation value for compensating at least a part of the self-aligning torque $T_{SAT}$ generated in the first control target 560, a disturbance torque caused by backlash generated in the first control target 560, and a torque ripple generated in the first control target 560.

The vehicle V equipped with the electric power steering device 1000 can travel according to a travel mode having an automatic driving mode and a manual driving mode. In this case, the gain $K_3$ of the gain adjuster 253 may be switched according to a travel mode. The greater the gain $K_3$ of the gain adjuster 253, the greater the degree of friction reduction.

The disturbance compensation value calculator 260 calculates a disturbance compensation value $V_d$ for compensating at least a part of the self-aligning torque $T_{SAT}$ generated in the first control target 560. In the present example embodiment, the disturbance compensation value $V_d$ includes a compensation value for compensating at least a part of frictional force generated in the first control target 560, a disturbance torque caused by backlash generated in the first control target 560, and a torque ripple generated in the first control target 560. The disturbance compensation value calculator 260 calculates the disturbance compensation value $V_d$ based on the differential torque $T_d$ that is a difference between the torque $T_p$ output from the first inverse nominal model 231 and the command torque $T_{rL1}$. That is, the disturbance compensation value calculator 260 calculates the disturbance compensation value $V_d$ based on the differential torque $T_d$ that is a difference between the torque $T_p$ calculated using the first nominal model NM1 based on output of the first control target 560 and the command torque Tri. As described above, a value from the subtractor SU4 input to the disturbance compensation value calculator 260 is a frequency component lower than the first cutoff frequency Cf1 in the differential torque $T_a$. Therefore, in the present example embodiment, the disturbance compensation value calculator 260 calculates the disturbance compensation value $V_d$ based on a component having a frequency lower than the first cutoff frequency Cf1 in the differential torque $T_a$.

The disturbance compensation value calculator 260 includes a limiter 262 and a gain adjuster 263. The limiter 262 limits an output value from the subtractor SU4. The limiter 262 clips an input value to an upper or lower threshold when the input value exceeds the upper or lower threshold. A threshold of the limiter 262 is different from a threshold of the limiter 252, for example. The gain adjuster 263 applies a gain $K_4$ to an output value from the limiter 262. A maximum value of the gain $K_4$ of the gain adjuster 263 is determined under a condition that the transfer function $P_s(s)$ of the first control target 560 is restricted to the transfer function $P_{sn}(s)$ of the first nominal model NM1. A value of the gain $K_4$ is different from a value of the gain $K_3$, for example. A value of the gain $K_4$ is, for example, about 0.1 or more and 0.8 or less in a manual driving mode. A value of the gain $K_4$ is, for example, substantially one in an automatic driving mode. That a value of the gain $K_4$ is one or substantially one includes that a value of the gain $K_4$ is 0.8 or more and 1 or less. The gain $K_4$ of the gain adjuster 263 may be switched according to a travel mode of the vehicle V.

The disturbance compensation value $V_d$ is a value that compensates for at least a part of a self-aligning torque component included in the frequency component $T_d$ of the differential torque $T_a$. For example, the disturbance compensation value calculator 260 calculates a value corresponding to about half of the self-aligning torque $T_{SAT}$ actually generated in the first control target 560 as the disturbance compensation value Va. The self-aligning torque $T_{SAT}$ actually generated in the first control target 560 is experimentally obtained in advance for each frequency, for example. A threshold of the limiter 262 of the disturbance compensation value calculator 260 and a value of the gain $K_4$ are adjusted to a value at which the disturbance compensation value $V_d$ is calculated as a value about 0.1 times or more and 0.8 times or less the magnitude of the self-aligning torque $T_{SAT}$ obtained in advance in a manual driving mode. A threshold of the limiter 262 of the disturbance compensation value calculator 260 and a value of the gain $K_4$ are adjusted to a value at which the disturbance compensation value $V_d$ is calculated as a value approximately one time, that is, approximately 0.8 times or more and one time or less the magnitude of the self-aligning torque $T_{SAT}$ obtained in advance in an automatic driving mode. The disturbance compensation value $V_d$ calculated by the disturbance compensation value calculator 260 is a value different from the friction compensation value $V_f$ calculated by the friction compensation value calculator 250.

Here, the frequency component $T_{aL}$ of the differential torque $T_d$ includes, in addition to the self-aligning torque $T_{SAT}$, frictional force generated in the first control target 560, a disturbance torque caused by backlash generated in the first control target 560, and a torque ripple generated in the first control target 560. Therefore, the disturbance compensation value $V_d$ obtained by processing of the frequency component $T_{aL}$ by the limiter 262 and the gain adjuster 263 also includes a compensation value for compensating at least a part of frictional force generated in the first control target 560, a disturbance torque caused by backlash generated in the first control target 560, and a torque ripple generated in the first control target 560.

In order to apply friction compensation and disturbance compensation performed in the assist adjustment portion 270 to the first correction torque $T_{rL1}$ used for model following control in the first model following controller 230, it is necessary to pay attention to a stability condition of the model following control. This condition is that a gain in a gain characteristic of a transfer function of the assist adjustment portion 270 restricted to a characteristic considering stability does not exceed one according to a small gain theorem described later. This is derived from a design condition of the second filter 232b. In the present example embodiment, the subtractor SU4 is provided in a preceding stage of the limiters 252 and 262 so that a value of the gains $K_3$ and $K_4$ in the gain adjusters 253 and 263 is set to one at the maximum and a gain in a gain characteristic becomes one under this condition, and subtraction processing is applied. In other words, the assist adjustment portion 270 behaves as a low-pass filter having a transfer function of $1-Q_1(s)$. $Q_1(s)$ is a transfer function of the first filter 232a that is a high-pass filter. The assist adjustment portion 270 performs low-pass filter processing having a transfer function of $1-Q_1(s)$ on a torque output from the second filter 232b, and adjusts a value applied with the processing in each of the friction compensation value calculator 250 and the disturbance compensation value calculator 260 and outputs the value.

Note that, for example, values of the gains $K_3$ and $K_4$ are determined such that 100% of a frictional force component is compensated for in both a manual driving mode and an automatic driving mode. Here, a target to be compensated by the friction compensation value calculator 250 is only a frictional force component, whereas a target to be compensated by the disturbance compensation value calculator 260 is all the disturbances including a frictional force component. In an automatic driving mode, for example, since it is preferable to compensate for substantially all disturbances, the gain $K_4$ of the disturbance compensation value calculator 260 is one or substantially one. In this case, since substantially all frictional force components are also compensated by compensation by the disturbance compensation value calculator 260, the gain $K_3$ of the friction compensation value calculator 250 is zero. On the other hand, in a passive driving mode, it is preferable to compensate for a frictional force component by 100% while making it easier for a steering person to drive the vehicle V by leaving a part of tire reaction force including the self-aligning torque $T_{SAT}$ and the like. For this reason, in a manual driving mode, the gain $K_4$ of the disturbance compensation value calculator 260 is preferably set to be smaller than one, and a frictional force component that is not compensated by the disturbance compensation value calculator 260 is preferably compensated by the friction compensation value calculator 250. For example, in a case where the gain $K_4$ of the disturbance compensation value calculator 260 is 0.8 in a manual driving mode, the gain $K_3$ of the friction compensation value calculator 250 is set to 0.2, and the friction compensation value calculator 250 compensates for 20% of a frictional force component that is not compensated by the disturbance compensation value calculator 260.

The adder AD4 adds an output value from the assist adjustment portion 270 to an output value from the first filter 232a. That is, the adder AD4 adds the friction compensation value $V_f$ and the disturbance compensation value $V_d$ to the frequency component $T_{aM}$. The adder AD4 outputs the first correction torque $T_{fl}$ calculated by adding the frequency component $T_{aM}$, the friction compensation value $V_f$, and the disturbance compensation value Va. The first correction torque $T_{fl}$ output from the adder AD4 is fed back to input of the first control target 560, that is, the command torque $T_{rL1}$. As described above, in the present example embodiment, the first model following controller 230 generates the first correction torque $T_{h1}$ by adding the friction compensation value $V_f$ and the disturbance compensation value $V_d$ to the differential torque $T_d$ from which a frequency component lower than the first cutoff frequency Cf1 is removed by the first filter 232a which is a high-pass filter, that is, the frequency component $T_{aM}$.

The first state feedback unit 280 feeds back a state compensation value $V_s$ to the command torque $T_{rL1}$ so that an apparent transfer function of the first control target 560 approaches the transfer function $P_{sn}(s)$ of the first nominal model NM1 based on output of the first control target 560. The apparent transfer function of the first control target 560 is, for example, a transfer function of one portion in a case where a portion located inside a feedback loop formed by the first model following controller 230 is regarded as the one portion. Specifically, in the present example embodiment, the apparent transfer function of the first control target 560 is a transfer function of an entire portion from the subtractor SU2 to output of the first control target 560, and is a transfer function of a portion combining the first state feedback unit 280 and the first control target 560. In the present example embodiment, the first state feedback unit 280 feeds back the state compensation value $V_s$ to the command torque $T_{rL1}$ after being corrected by the first correction torque $T_{fl}$ and before being input to the first control target 560.

The state compensation value $V_s$ includes a compensation value for compensating at least a part of inertial force generated in the first control target 560, viscous force generated in the first control target 560, and frictional force generated in the first control target 560. More specifically, the state compensation value $V_s$ includes a compensation value that compensates at least a part of inertial force generated in the motor 543, viscous force generated in the motor 543, and frictional force generated in the motor 543. In the present example embodiment, the state compensation value $V_s$ is a compensation value including inertial force generated in the motor 543, viscous force generated in the motor 543, and frictional force generated in the motor 543.

The first state feedback unit 280 includes an inertia compensator 281, a viscosity compensator 282, and a friction compensator 283. The inertia compensator 281 calculates a compensation value for compensating at least a part of inertial force generated in the motor 543 based on the steering angle $\theta_s$. The viscosity compensator 282 calculates a compensation value for compensating at least a part of viscous force generated in the motor 543 based on the steering angle $\theta_s$. The friction compensator 283 calculates a compensation value for compensating at least a part of frictional force generated in the motor 543 based on the steering angle $\theta_s$. In the present example embodiment, the state compensation value $V_s$ includes a compensation value calculated by the inertia compensator 281, a compensation value calculated by the viscosity compensator 282, and a compensation value calculated by the friction compensator 283. A compensation value calculated by the inertia compensator 281, a compensation value calculated by the viscosity compensator 282, and a compensation value calculated by the friction compensator 283 are output to the adder AD3 and added to the command torque $T_{rL1}$ corrected by the first correction torque $T_{f1}$.

Next, control by the first model following controller 230 will be described in more detail. The first model following controller 230 controls the first control target 560 by using an inverse model of the first nominal model NM1 included as an internal model, that is, the first inverse nominal model 231. In the present example embodiment, a torque ripple or the like depending on an angular velocity of the motor 543 can be compensated by a feedback loop formed by the first model following controller 230.

The first model following controller 230 is structurally similar to a conventional disturbance estimator (disturbance observer), but has different actions and effects. A conventional disturbance estimator estimates a disturbance torque by using an inverse plant model as an internal model as a model close to the first control target 560, and reduces influence of disturbance by adjusting a disturbance torque in advance.

Control by the first model following controller 230 according to the present example embodiment utilizes an effect that the transfer function $P_s(s)$ of the first control target 560 is restricted to the transfer function $P_{sn}(s)$ of the first nominal model NM1 included as an internal model by a feedback loop. For example, if the first nominal model NM1 is defined such that there is no torque ripple, the transfer function $P_s(s)$ of the first control target 560 is restricted to a characteristic without a torque ripple by model following control. As a result, a torque ripple can be reduced by applying torque ripple compensation. Further, the first control target 560 can be treated as a low inertia model by setting the first nominal model NM1 as a low inertia model and restricting the first control target 560 with the first nominal model NM1. Further, the first control target 560 can be treated as a low viscosity model by setting the first nominal model NM1 as a low viscosity model and restricting the first control target 560 with the first nominal model NM1. By the first model following controller 230 executing model following control, for example, lost torque compensation or motor inertia compensation is performed in addition to compensation of a torque ripple of the motor 543. By appropriately setting $J_n$ and $B_n$ in Formulas (16) and (17) described above, a desired frequency characteristic can be given to the transfer function $P_s(s)$ of the first control target 560.

When a modeling error between the transfer function $P_s(S)$ of the first control target 560 and the transfer function $P_{sn}(S)$ of the first nominal model NM1 is A(s), the transfer function $P_s(S)$ of the first control target 560 is expressed by Formula (18) below.

[Mathematical formula 18]

$$P_s(s) = \frac{1}{J_n s^2 + B_n s}(1 + \Delta(s)) \tag{18}$$

Note that the transfer function $P_s(s)$ of the first control target 560, that is, a plant characteristic in model following control of the first model following controller 230 is not limited to the example of Formula (18) above, and may be expressed in any manner. The transfer function $P_s(s)$ of the first control target 560 may be expressed as a two-inertia system, or may be expressed by an equation derived by high-order approximation.

A gain characteristic of the transfer function $P_s(s)$ of the first control target 560 has peaks at two frequency values, for example. The modeling error $\Delta(s)$ appears, for example, near a higher frequency peak of two peaks in a gain characteristic of the first control target 560. For this reason, as illustrated in FIG. 17, the reciprocal $1/\Delta(s)$ of the modeling error $\Delta(s)$ has a bottom in a relatively high frequency domain. In FIG. 17, the modeling error $\Delta(s)$ is indicated by an absolute value. When the modeling error $\Delta(s)$ is large, a deviation between the transfer function $P_s(s)$ of the first control target 560 and the transfer function $P_{sn}(s)$ of the first nominal model NM1 becomes large, and control of the first control target 560 using the first nominal model NM1 by the first model following controller 230 becomes unstable. For this reason, in a domain where the modeling error $\Delta(s)$ is relatively small, the first control target 560 can be stably and suitably controlled by setting a gain of the complementary sensitivity function T(s) to be approximately one and restricting the first control target 560 to the first nominal model NM1. A frequency characteristic of the modeling error $\Delta(s)$ can be adjusted by adjusting $J_n$ and $B_n$ in the transfer function $P_{sn}(s)$ of the first nominal model NM1. A frequency band where a gain of complementary sensitivity function T(s) becomes one can be adjusted by adjusting the first cutoff frequency Cf1 and the second cutoff frequency Cf2. By the above, a gain of the complementary sensitivity function T(s) can be adjusted to be one in a frequency band where the modeling error $\Delta(s)$ is small.

In FIG. 17, $1/\Delta(s)$ is relatively high in a frequency band of the second cutoff frequency Cf2 or less, and rapidly decreases in a frequency band higher than the second cutoff frequency Cf2. Model following control for restricting the first control target 560 to the first nominal model NM1 can be stably performed, for example, in a range where $1/\Delta(s)$ is larger than one, that is, in a range larger than 0 dB. For this reason, as illustrated in FIG. 17, by adjusting $1/\Delta(s)$ to be larger than one in a frequency band in which a gain of the complementary sensitivity function T(s) is one, in a case where a gain of the complementary sensitivity function T(s) is one, the first control target 560 can be restrained to the first nominal model NM1 to be stably and suitably controlled.

For example, in order to expand a frequency band in which the first control target 560 can be restricted to the first nominal model NM1 to be stably and suitably controlled, the second cutoff frequency Cf2 is preferably made high within a range in which $1/\Delta(s)$ is not one or less, that is, within a frequency band lower than a frequency at which a curve indicating $1/\Delta(s)$ intersects the horizontal axis in FIG. 17. However, if the second cutoff frequency Cf2 is made too high, a gain of the complementary sensitivity function T(s) remains relatively high even though $1/\Delta(s)$ becomes low in a frequency band higher than the second cutoff frequency Cf2, and control may become unstable. On the other hand, in the present example embodiment, since the order of the second filter 232b, which is a low-pass filter, is set to third order or more, a gain of the complementary sensitivity function T(s) can be steeply decreased in a region where a frequency is higher than the second cutoff frequency Cf2. By the above, if the second cutoff frequency Cf2 is made relatively high, a gain of the complementary sensitivity function T(s) can be immediately lowered in a frequency band higher than the second cutoff frequency Cf2, so that control of the first control target 560 can be prevented from becoming unstable.

Robust stability of the first model following controller 230 is guaranteed when a small-gain theorem shown in Formula (19) below is established between the complementary sensitivity function T(s) and the modeling error $\Delta(s)$.

[Mathematical formula 19]

$$|T(j\omega)| < \frac{1}{|\Delta(j\omega)|}, \quad \text{or} \quad |T(j\omega)\Delta(j\omega)| < 1, \quad \forall s = j\omega \tag{19}$$

As described above, in order to perform model following control using the first nominal model NM1 in the first model following controller 230, the complementary sensitivity gain GT of the complementary sensitivity function T(s) is preferably substantially one, but in consideration of robust stability, it is necessary to satisfy Formula (19) above. As understood from this, it is not possible to achieve both setting of the complementary sensitivity gain GT to substantially one in all frequency bands and Formula (19), and it is not possible to achieve both reduction in disturbance or the like by the first model following controller 230 and robust stability.

As illustrated in FIG. 17, the complementary sensitivity gain GT of the complementary sensitivity function T(s) is smaller than one also in a low frequency domain FA1 where the frequency f is lower than the first cutoff frequency Cf1. In a region where the complementary y sensitivity gain GT of the complementary sensitivity function T(s) is smaller than 1, the first control target 560 is controlled by control of the command torque $T_{rL1}$. As described above, in a high frequency domain FA2 where a frequency is higher than the second cutoff frequency Cf2, the complementary sensitivity gain GT of the complementary sensitivity function T(s) is greatly lowered, and the first correction torque $T_{rL1}$ from the first model following controller 230 is hardly fed back to input of the first control target 560. On the other hand, in the low frequency domain FA1, the complementary sensitivity gain GT of the complementary sensitivity function T(s) is set to a certain magnitude, and the first correction torque $T_{f1}$ is fed back to input of the first control target 560. In the low frequency domain FA1, a compensation value generated in the assist adjustment portion 270 described above is fed back to input of the first control target 560 according to the complementary sensitivity gain GT of the complementary sensitivity function T(s).

The control device 100 performs torque control in the first assist controller 210, the second assist controller 220, and the vehicle stabilization controller 240 with respect to a torque signal having a low frequency lower than the first cutoff frequency Cf1, and performs control such that an angular velocity becomes substantially zero with respect to disturbance having a high frequency higher than the second cutoff frequency Cf2, so as to realize stabilization of steering so that the steering wheel 521 does not pull. In order to achieve this object, the control device 100 executes decreasing of a high frequency gain of torque control by using the first assist controller 210, the second assist controller 220, and the vehicle stabilization controller 240, and restriction of the transfer function $P_s(s)$ of the first control target 560 to a characteristic in which a high frequency gain decreases by using the first model following controller 230. The latter processing is performed so that the first control target 560 does not react to a disturbance when the disturbance is input to the first control target 560.

Assuming that $C_2(s)$ is a transfer function of a portion from after the subtractor SU1 to which the steering angle $\theta_h$ is input to before the adder AD1 to which output of the disturbance sensitivity controller 290 is input, and that a disturbance torque $T_a(s)$ that is a disturbance sensitivity characteristic, that is, a ratio of the first correction torque $T_{f1}$ to disturbance input to the first control target 560 is a variable parameter m, a transfer characteristic from the disturbance torque $T_a(s)$ to a steering torque $T_h(s)$ is expressed as Formula (20) below by using the complementary sensitivity function T(s), and the complementary sensitivity function T(s) is expressed as Formula (21) below.

[Mathematical formula 20]

$$\frac{T_h(s)}{T_d(s)} = -\frac{1-m}{1+C_2(s)P_s(s)}P_s(s)K_{tor} = (1-T(s))P_s(s)K_{tor} \tag{20}$$

[Mathematical formula 21]

$$T(s) = \frac{C_2(s)P_s(s)+m}{1+C_2(s)P_s(s)} \tag{21}$$

Formula (20) above shows that disturbance is completely prevented when the complementary sensitivity function T(s) is one, and at least a part of disturbance is transmitted when the complementary sensitivity function T(s) is smaller than one. Therefore, disturbance to be transmitted and disturbance to be reduced are divided by a frequency domain, and the complementary sensitivity function T(s) is subjected to frequency shaping accordingly, so that disturbance sensitivity design for each frequency domain can be performed. The variable parameter m in Formulas (20) and (21) above is equal to a ratio at which the disturbance torque $T_d$ is compensated by the first correction torque $T_{f1}$, and $T_{f1}=mT_d$ is satisfied. For example, when the variable parameter m is 0.5, the disturbance torque $T_d$ is compensated by 50% by the first correction torque $T_{f1}$. In the present example embodiment, in a case where assist control by the first assist controller 210 is not performed, the variable parameter m is 0.1 or more and 0.8 or less. In a case where assist control by the first assist controller 210 is executed, the variable parameter m is one or substantially one. The variable parameter m being substantially one includes a variable parameter m of 0.8 or more and one or less.

In a case where the transfer function $P_s(s)$ of the first control target 560 is expressed by Formula (18) described above, $C_2(s)=K_{tor}+K_{ass}$ is satisfied, and thus a stationary gain T(0) of the complementary sensitivity function T(s) at s=0 is expressed by Formula (22) below from Formula (21) above. That is, when a spring constant of the torsion bar 546 is $K_{tor}$, an inclination of the self-aligning torque $T_{SAT}$ generated in the tires 529A and 529B of the vehicle V with respect to the steering angle $\theta_s$, which is a rotation angle of the output shaft 524*b*, is $K_{SAT}$, an inclination of the assist torque $T_{ass}$ with respect to the input torque $T_{ad}$ is $K_{ass}$, a stationary gain is T(0), and a variable parameter, which is a ratio of the first correction torque $T_{rL1}$ to disturbance input to the first control target 560, that is, the disturbance torque $T_a$, is m, Formula (22) below is established.

[Mathematical formula 22]

$$T(0) = \frac{K_{tor} + K_{ass} + mK_{SAT}}{K_{tor} + K_{ass} + K_{SAT}} \quad (22)$$

In a stationary state such as a case where the steering wheel 521 is at or near a center position and a case where the traveling speed $V_v$ of the vehicle V is high, the assist gain $K_{ass}$ is a value close to zero. Further, the spring constant $K_{tor}$ of the torsion bar 546 is sufficiently smaller than the self-aligning torque gain $K_{SAT}$. For this reason, in a stationary state such as a case where the steering wheel 521 is at or near a center position and a case where the traveling speed $V_v$ of the vehicle V is high, the stationary gain T(0) has a value close to a ratio of the first correction torque $T_{rL1}$ to the disturbance torque $T_a$(s), that is, the variable parameter m from Formula (22) above. The stationary gain T(0) of the complementary sensitivity function T(s) expressed by Formula (22) above is 0.1 or more. In the present example embodiment, the stationary gain T(0) is 0.3 or more. The stationary gain T(0) is, for example, 0.5 or less. The stationary gain T(0) is a minimum value of the complementary sensitivity gain GT in the low frequency domain FA1.

Conventionally, for example, the complementary sensitivity function T(s) in the low frequency domain FA1 has a waveform as indicated by a two-dot chain line in FIG. 17. In the present example embodiment, model following control by the first model following controller 230 described above is performed, so that the stationary gain T(0) of the complementary sensitivity function T(s) can be set as in Formula (22) above, and the complementary sensitivity function T(s) can be formed into a waveform as indicated by a solid line in FIG. 17 with respect to the frequency f.

In the present example embodiment, a low frequency portion TFA1 which is a portion of the low frequency domain FA1 in a waveform of the complementary sensitivity gain GT of the complementary sensitivity function T(s) illustrated in FIG. 17 is formed by the first filter 232*a*, the assist adjustment portion 270, and the adder AD4 in the first model following controller 230. More specifically, the frequency component $T_{aM}$ output from the first filter 232*a*, which is a high-pass filter, and the friction compensation value $V_f$ and the disturbance compensation value $V_d$ output from the assist adjustment portion 270 functioning as a low-pass filter are added together, so that a waveform of the low frequency portion TFA1 is generated. A value at which the frequency f becomes zero in the low frequency portion TFA1 is a value at which s=0 in the complementary sensitivity function T(s), and is the stationary gain T(0) expressed by Formula (22) described above.

As illustrated in FIG. 17, the first cutoff frequency Cf1 is higher than a first resonance frequency $f_{yaw}$. The first resonance frequency $f_{yaw}$ is equal to the natural frequency $f_\gamma$ of the yaw rate $\gamma$ of the vehicle V. That is, a lower limit value of a frequency band in which the complementary sensitivity gain GT is one is higher than the first resonance frequency $f_{yaw}$ equal to the natural frequency $f_\gamma$ of the yaw rate $\gamma$ of the vehicle V. In a case where the natural frequency $f_\gamma$ of the yaw rate $\gamma$ is not restricted to the parameter $f_r$ by the second model following controller 241, the first resonance frequency $f_{yaw}$ is, for example, about 1 Hz or more and 1.5 Hz or less. In the present example embodiment, since the natural frequency $f_\gamma$ of the yaw rate $\gamma$ of the vehicle V can be restricted to the desired parameter $f_r$ as described above, the first resonance frequency $f_{yaw}$ is about 2 Hz or more and 4 Hz or less.

A second resonance frequency $f_{st}$ illustrated in FIG. 17 is a resonance frequency of the steering assembly 530. More specifically, the second resonance frequency $f_{st}$ is a resonance frequency of a mode including a spring element that generates inertia of the entire steering assembly 530 and the self-aligning torque $T_{SAT}$. The second resonance frequency $f_{st}$ is higher than the first resonance frequency $f_{yaw}$ and lower than a lower limit value of a frequency band in which the complementary sensitivity gain GT is one, that is, the first cutoff frequency Cf1. The second resonance frequency $f_{st}$ is, for example, about 3 Hz or more and 5 Hz or less. The complementary sensitivity gain GT at the second resonance frequency $f_{st}$ is higher than the complementary sensitivity gain GT at the first resonance frequency $f_{yaw}$. The complementary sensitivity gain GT at the second resonance frequency $f_{st}$ is 0.5 or more and less than 1. In the present example embodiment, the complementary sensitivity gain GT at the second resonance frequency $f_{st}$ is 0.8 or more.

In the present example embodiment, a high frequency portion TFA2 which is a portion of the high frequency domain FA2 in a waveform of the complementary sensitivity gain GT of the complementary sensitivity function T(s) illustrated in FIG. 17 is formed by the second filter 232*b* in the first model following controller 230.

The low frequency portion TFA1 which is a portion in the low frequency domain FA1 of a waveform of the complementary sensitivity gain GT of the complementary sensitivity function T(s) may be formed by a phase-lead compensator. Specifically, the first filter 232*a* may be a phase-lead compensator. In this case, the complementary sensitivity function T(s) is a function including a transfer function of the second filter 232*b* as a low-pass filter and a transfer function of a phase-lead compensator. In this case, the complementary sensitivity gain GT of the complementary sensitivity function T(s) can be suitably adjusted to the above-described numerical range, and a waveform of the complementary sensitivity gain GT as illustrated in FIG. 17 can be realized.

In a case where the low frequency portion TFA1 which is a portion in the low frequency domain FA1 of a waveform of the complementary sensitivity gain GT of the complementary sensitivity function T(s) is formed by a phase-lead compensator, a transfer function F(s) of the phase-lead compensator is expressed by Formula (23) below.

[Mathematical formula 23]

$$F(s) = \frac{s + \omega_a}{s + \omega_b} \quad (23)$$

where, s is a Laplace transformer, and $\omega_a$ and $\omega_b$ are parameters appropriately set according to a ratio between assist control by the first assist controller 210 and assist control by the second assist controller 220.

The above-described variable parameter m is the stationary gain F(0) of Formula (23) above. That is, $m=\omega_a/\omega_b$. For this reason, when $\omega_a=\omega_b$, the disturbance torque $T_d$ including the self-aligning torque $T_{SAT}$ can be compensated to the maximum. Specifically, in a case where $\omega_a=\omega_b$, the disturbance torque $T_d$ can be compensated by about 100%. In a case where lane keeping control is performed by the first assist controller 210, it is preferable to set m to one or a value close to one as $\omega_a=\omega_b$ or $\omega_a\approx\omega_b$, and compensate the disturbance torque $T_d$ to the maximum. In a case where assist control by the first assist controller 210 is not executed and only assist control by the second assist controller 220 is executed, when a ratio of the disturbance torque $T_d$ transmitted to a steering person is n, m=1-n is satisfied. By the above, the variable parameter m is obtained, and the parameters $\omega_a$ and $\omega_b$ can be calculated.

In a case of sharing control in which assist control by the first assist controller 210 and assist control by the second assist controller 220 are simultaneously performed, a value of the parameter $\omega_a$ is adaptively adjusted with respect to the steering torque $T_h$. In this case, the parameter $\omega_a$ is expressed by Formula (24) below.

[Mathematical formula 24]

$$\omega_a = m * \omega_b \frac{T_h}{T_h^*} + \omega_b \left(1 - \frac{T_h}{T_h^*}\right) \qquad (24)$$

Here, m* is a constant that is a ratio for compensating disturbance torque $T_d$ in a case where assist control by the first assist controller 210 is not executed and only assist control by the second assist controller 220 is executed, and $T_h^*$ is a steering torque in a case where assist control by the first assist controller 210 is not executed and only assist control by the second assist controller 220 is executed. The constant m* is a constant within a range of 0.1 or more and 0.8 or less.

The variable parameter m changes based on the second gain $K_2$. The variable parameter m is represented by m=m*× $K_2$+$K_1$. In a case where assist control by the first assist controller 210 is not performed, the second gain $K_2$ is one. In a case where the second gain $K_2$ is one, the first gain $K_1$ is zero, and the variable parameter m is a constant m*, that is, 0.1 or more and 0.8 or less. From a relationship of $K_1$=1-$K_2$, when 1-m*is m, the variable parameter m can be expressed as m=1-m×$K_2$. This formula shows that the variable parameter m becomes smaller as the second gain $K_2$ is larger, and the variable parameter m becomes larger as the second gain $K_2$ is smaller. That is, the variable parameter m and the second gain $K_2$ have a complementary relationship with each other. In the present example embodiment, the variable parameter m is equal to the gain $K_4$ described above.

As shown by Formula (22), the stationary gain T(0) of the complementary sensitivity function T(s) becomes larger as the variable parameter m is larger. In the present example embodiment, the stationary gain T(0) of the complementary sensitivity function T(s) in a case where the first assist controller 210 executes assist control, that is, lane keeping control is larger than the stationary gain T(0) of the complementary sensitivity function T(s) in a case where the first assist controller 210 does not execute lane keeping control.

In a control method for controlling the steering assembly 530 mounted on the vehicle V performed by the control device 100 described above, lane keeping control includes calculating the yaw rate target value $\gamma_r$ which is a target value of the yaw rate $\gamma$ of the vehicle V and the lateral displacement $y_{of}$ the vehicle V based on input from the imaging device 400, generating the yaw rate command torque $T_\gamma$ based on the yaw rate target value $\gamma_r$, generating the lateral displacement command torque $T_y$ based on the lateral displacement $y_{of}$, adjusting the yaw rate command torque $T_\gamma$ according to the frequency f in the yaw rate adjustment portion 213*b*, and adjusting the lateral displacement command torque $T_y$ according to the frequency f in the lateral displacement adjustment portion 214*b*.

Further, a control method of controlling the steering assembly 530 mounted on the vehicle V performed by the control device 100 described above includes generating the first command torque $T_{LKA}$ by lane keeping control for keeping the vehicle V in the lane L, generating the second command torque $T_r$ based on the steering torque $T_h$ input from the steering wheel 521 of the vehicle V, calculating the command torque $T_{rL1}$ based on the first command torque $T_{LKA}$ multiplied by the first gain $K_1$ and the second command torque $T_r$ multiplied by the second gain $K_2$, and executing model following control for generating the first correction torque $T_{f1}$ for correcting the command torque $T_{rL1}$ based on output of the first control target 560 including the motor 543 provided in the steering assembly 530 and the first nominal model NM1 based on a configuration of the first control target 560, and restricting, by model following control, the transfer function $P_s(s)$ of the first control target 560 to a transfer function Pas(s) of the first nominal model NM1 in a frequency band in which the complementary sensitivity gain GT, which is a gain in a gain characteristic of the complementary sensitivity function T(s) with respect to the modeling error $\Delta(s)$ between the first control target 560 and the first nominal model NM1, is one or substantially one.

According to the present example embodiment, the control device 100 includes the first assist controller 210 capable of executing lane keeping control for keeping the vehicle V in the lane L. The first assist controller 210 includes the vehicle state calculator 211 that calculates the yaw rate target value $\gamma_r$ which is a target value of the yaw rate $\gamma$ of the vehicle V and the lateral displacement $y_{of}$ the vehicle V based on input from the imaging device 400, the yaw rate controller 213 that generates the yaw rate command torque $T_\gamma$ based on the yaw rate target value $\gamma_r$, and the lateral displacement controller 214 that generates the lateral displacement command torque $T_\gamma$ based on the lateral displacement $y_{of}$. The yaw rate controller 213 includes the yaw rate adjustment portion 213*b* that adjusts the yaw rate command torque $T_\gamma$ according to the frequency f. The lateral displacement controller 214 includes the lateral displacement adjustment portion 214*b* that adjusts the lateral displacement command torque $T_7$ according to the frequency f. A gain of the transfer function $C_\gamma(s)$ of the yaw rate adjustment portion 213*b* in the first frequency band fb1 is lower than a gain of the transfer function $C_\gamma(s)$ of the yaw rate adjustment portion 213*b* in the second frequency band fb2 higher than the first frequency band fb1. A gain of the transfer function $C_y(s)$ of the lateral displacement adjustment portion 214*b* in the second frequency band fb2 is lower than a gain of the transfer function $C_y(s)$ of the lateral displacement adjustment portion 214*b* in the first frequency band fb1.

Here, the yaw rate $\gamma$ is adjusted by rotating the steering wheel 521 and inclining a traveling direction of the vehicle V, whereas the lateral displacement $y_{of}$ is adjusted by how long a state of inclination of a traveling direction is maintained. For this reason, a frequency at which the steering wheel 521 is steered in a case of adjusting the yaw rate $\gamma$ tends to be higher than a frequency at which the steering wheel 521 is steered in a case of adjusting the lateral displacement $y_{of}$. Therefore, by decreasing a gain of the transfer function $C_\gamma(s)$ of the yaw rate adjustment portion 213*b* in the relatively low first frequency band fb1 and decreasing a gain of the transfer function $C_y(s)$ of the lateral displacement adjustment portion 214*b* in the relatively high second frequency band fb2, it is possible to easily control the yaw rate Y and the lateral displacement $y_{of}$ each in a preferable frequency band. Specifically, it is easy to increase influence of the yaw rate command torque $T_\gamma$ for adjusting the yaw rate $\gamma$ in the relatively high second frequency band fb2, and it is easy to increase influence of the lateral displacement command torque $T_y$ for adjusting the lateral displacement $y_{of}$ in the relatively low first frequency band fb1. As described above, the yaw rate $\gamma$ and the lateral displacement $y_{of}$ can both be controlled with high accuracy by performing control separately in a frequency band in which control of the yaw rate $\gamma$ is enhanced and in a frequency band in which control of the lateral displacement $y_{of}$ is enhanced. By the above, in lane keeping control, accuracy of keeping the vehicle V in the lane L can be improved. In the present example embodiment, the control device 100 has two feedback means of the yaw rate $\gamma$ and the lateral displacement $y_{of}$ so that each parameter can be adjusted with high accuracy.

Further, according to the present example embodiment, when a transfer function of the yaw rate adjustment portion 213*b* is $C_\gamma(s)$, a transfer function of the lateral displacement adjustment portion 214*b* is $C_y(s)$, and a constant of about one is $K_{yy}$, $C_y(s) = K_{yy} - C_\gamma(s)$ is satisfied. For this reason, the transfer function $C_\gamma(s)$ of the yaw rate adjustment portion 213*b* and the transfer function $C_y(s)$ of the lateral displacement adjustment portion 214*b* can be substantially complementary to each other. By the above, it is possible to more suitably divide a frequency band in which influence of the yaw rate command torque $T_\gamma$ is large and a frequency band in which influence of the lateral displacement command torque $T_y$ is large. Therefore, the yaw rate $\gamma$ and the lateral displacement $y_{of}$ can be more suitably controlled according to a frequency band. For this reason, in lane keeping control, accuracy of keeping the vehicle V in the lane L can be further improved.

Further, according to the present example embodiment, the control device 100 includes the vehicle stabilization controller 240 that restricts a plant model having the actual steering angle $\theta_t$ of the tires 529A and 529B of the vehicle V as input and the yaw rate $\gamma$ as output, that is, the transfer function $G_\theta{}^\gamma(s)$ of the second control target 580 to the predetermined transfer function $P_{nv}(s)$ of the second nominal model NM2 by model following control. The vehicle stabilization controller 240 includes the second model following controller 241 that performs model following control. The second model following controller 241 is configured such that the transfer function $G_\theta{}^\gamma(s)$ of the second control target 580 is restricted to the transfer function $P_{nv}(s)$ of the second nominal model NM2 in a frequency band in which a gain in a gain characteristic of a complementary sensitivity function with respect to a modeling error between the second control target 580 and the second nominal model NM2 is one or substantially one. The transfer function $P_{nv}(s)$ of the second nominal model NM2 includes a parameter $f_n$ corresponding to the natural frequency $f_\gamma$ of the yaw rate $\gamma$. The yaw rate controller 213 includes the yaw rate phase adjustment portion 213*c* that adjusts a phase of the yaw rate target value $\gamma_r$. A transfer function of the yaw rate phase adjustment portion 213*c* includes a transfer function by which the parameter $f_n$ corresponding to the natural frequency $f_\gamma$ of the yaw rate $\gamma$ in the transfer function $P_{nv}(s)$ of the second nominal model NM2 can be converted into a different value. For this reason, by model following control by the second model following controller 241, a characteristic of the vehicle V can be restricted to the second nominal model NM2, and the parameter $f_n$ corresponding to the natural frequency $f_\gamma$ of the yaw rate $\gamma$ in the second nominal model NM2 can be adjusted to a desired value, that is, the parameter $f_r$. By the above, traveling stability of the vehicle V can be further improved.

Further, according to the present example embodiment, the control device 100 includes the second assist controller 220 that generates the second command torque $T_r$ as a second input value input to the vehicle stabilization controller 240 based on the steering torque $T_h$ as a steering input value input from the steering wheel 521 of the vehicle V. The first assist controller 210 generates the first command torque $T_{LKA}$ as a first input value. The second assist controller 220 receives the first command torque $T_{LKA1}$ multiplied by the first gain $K_1$ and the steering torque $T_{h1}$ multiplied by the second gain $K_2$. The first gain $K_1$ and the second gain $K_2$ are variable values. When the first gain is $K_1$ and the second gain is $K_2$, $K_1 = 1 - K_2$ is satisfied. For this reason, a ratio of the first command torque $T_{LKA1}$ input from the first assist controller 210 to the second assist controller 220 can be changed by adjusting a value of the second gain $K_2$. By the above, in sharing control in which assist control by the first assist controller 210 and assist control by the second assist controller 220 are simultaneously performed, a control amount of the assist control by the first assist controller 210 can be adjusted according to the magnitude of the steering torque $T_h$ and the like.

Further, according to the present example embodiment, the first command torque $T_{LKA1}$ as a first input value multiplied by the first gain $K_1$ is also input to the vehicle stabilization controller 240. For this reason, input similar to input mechanically transmitted to the steering assembly 530 by a steering person steering the steering wheel 521 can also be input from the first assist controller 210. By the above, assist control by the first assist controller 210 can be brought close to that in a case where a steering person steers the steering wheel 521. Therefore, in a case where assist control is performed by the first assist controller 210, it is possible to reduce a sense of discomfort of a steering person.

Conventionally, lane keeping control needs to be performed in a small torque range for safety. For this reason, it has been necessary to adjust an assist function for the lane keeping control, and the adjustment has required time. The small torque range for safety is a range of the steering torque $T_h$ that can be easily corrected by the intention of a steering person if abnormal output is output by lane keeping control. Further, conventionally, when a torque for performing lane keeping control, that is, a control amount of lane keeping control is increased, a sense of discomfort is generated to a steering person. For this reason, it has been difficult to increase a control amount of lane keeping control, and there has been a case where accuracy of lane keeping control cannot be sufficiently improved.

In view of the above problem, according to the present example embodiment, the control device 100 includes the disturbance sensitivity controller 290 to which the command torque $T_{rL1}$ calculated based on the first command torque $T_{LKA1}$ as a first input value multiplied by the first gain $K_1$ and the second command torque $T_r$ as a second input value multiplied by the second gain $K_2$ is input. The disturbance sensitivity controller 290 includes the first model following controller 230 that generates the first correction torque $T_{f1}$ for correcting the command torque $T_{rL1}$ based on output of the first control target 560 including the motor 543 provided in the steering assembly 530 and the first nominal model NM1 based on a configuration of the first control target 560. The first model following controller 230 is configured such that a transfer function $P_s(s)$ of the first control target 560 is restricted to the transfer function Pas(s) of the first nominal model NM1 in a frequency band in which the complementary sensitivity gain GT which is a gain in a gain characteristic of the complementary sensitivity function $T(s)$ with respect to the modeling error $\Delta(s)$ between the first control target 560 and the first nominal model NM1 is one or substantially one. The complementary sensitivity function $T(s)$ includes the variable parameter m that changes based on the second gain $K_2$.

For this reason, disturbance such as the self-aligning torque $T_{SAT}$ can be compensated by model following control by the first model following controller 230 of the disturbance sensitivity controller 290. By the above, in a case where lane keeping control is executed by the first assist controller 210, the lane keeping control can be accurately executed if a control amount by the first assist controller 210 is reduced. Therefore, it is possible to improve accuracy of lane keeping control while reducing a control amount by the first assist controller 210 to reduce a sense of discomfort felt by a steering person from the steering wheel 521. Further, since disturbance can be compensated by model following control, the above-described assist function adjustment for lane keeping control is unnecessary if a control amount by the first assist controller 210 is reduced. Further, the complementary sensitivity function $T(s)$ in the first model following controller 230 includes the variable parameter m that changes based on the second gain $K_2$. For this reason, a ratio of disturbance compensated by the first model following controller 230 is adjusted according to a change in the second gain $K_2$. By the above, for example, in a case where the second gain $K_2$ becomes small and lane keeping control by the first assist controller 210 becomes strong, the variable parameter m can be changed to increase a compensation ratio of disturbance. Therefore, a compensation ratio for disturbance can be adjusted according to a ratio between control by the first assist controller 210 and control by the second assist controller 220. For this reason, it is possible to further improve accuracy of lane keeping control while further reducing a sense of discomfort felt by a steering person from the steering wheel 521.

Further, according to the present example embodiment, the first gain $K_1$ in a case where the first assist controller 210 executes lane keeping control is larger than the first gain $K_1$ in a case where the first assist controller 210 does not execute the lane keeping control. The stationary gain $T(0)$ of the complementary sensitivity function $T(s)$ in a case where the first assist controller 210 executes lane keeping control is larger than the stationary gain $T(0)$ of the complementary sensitivity function $T(s)$ in a case where the first assist controller 210 does not execute lane keeping control. For this reason, in a case where the first assist controller 210 executes lane keeping control, a ratio of disturbance compensated by the first model following controller 230 can be made large as compared with a case where the lane keeping control is not executed. This makes it possible to further improve accuracy of lane keeping control while reducing a control amount by the first assist controller 210.

Further, according to the present example embodiment, the stationary gain $T(0)$ of the complementary sensitivity function $T(s)$ becomes larger as the variable parameter m is larger. The variable parameter m and the second gain $K_2$ have a complementary relationship with each other. For this reason, as a ratio of lane keeping control by the first assist controller 210 to control by the second assist controller 220 becomes larger, a compensation ratio of disturbance by the disturbance sensitivity controller 290 can be continuously made larger. By the above, it is possible to suitably improve accuracy of lane keeping control while suitably reducing a control amount by the first assist controller 210 according to a ratio of control by the first assist controller 210. Further, assist control by the first assist controller 210, that is, lane keeping control and assist control by the second assist controller 220 can be linearly and continuously adjusted. By the above, in sharing control in which assist control by the first assist controller 210 and assist control by the second assist controller 220 are simultaneously performed, it is possible to prevent a switching characteristic of control from becoming non-linear, and it is possible to reduce a sense of discomfort of a steering person.

Further, according to the present example embodiment, the second assist controller 220 generates the assist torque $T_{ass}$ for compensating at least a part of the self-aligning torque $T_{SAT}$ generated in the tires 529A and 529B of the vehicle V based on a torsion bar torque generated in the torsion bar 546, that is, the input torque $T_{ad}$ calculated based on the steering torque $T_h$. The second command torque $T_r$ as a second input value is calculated based on the assist torque $T_{ass}$. The variable parameter m is a ratio of the first correction torque $T_{f1}$ to disturbance input to the first control target 560. When a spring constant of the torsion bar 546 is $K_{tor}$, an inclination of the self-aligning torque $T_{SAT}$ generated in the tires 529A and 529B of the vehicle V with respect to the steering angle $\theta_s$, which is a rotation angle of the output shaft 524b, is $K_{SAT}$, an inclination of the assist torque $T_{ass}$ with respect to the input torque $T_{ad}$ is $K_{ass}$, a stationary gain of the complementary sensitivity function $T(s)$ is $T(0)$, and a variable parameter is m, Formula (22) above is established. Since the stationary gain $T(0)$ of the complementary sensitivity function $T(s)$ can be expressed by Formula (22) including the variable parameter m, a compensation ratio of disturbance can be more easily adjusted according to a change in the second gain $K_2$.

Note that, in the present example embodiment, a yaw rate command value generated by the yaw rate controller 213 and a lateral displacement command value generated by the lateral displacement controller 214 are not limited to a torque, and may be an angle. In a case where a yaw rate command value and a lateral displacement command value are angles, a first input value output from the first assist controller 210 may be a torque or an angle. In a case where a first input value output from the first assist controller 210 is an angle, an input value input to the second assist controller 220 is also an angle. Further, in this case, an input value input to the vehicle stabilization controller 240 is also an angle.

Figure 19:
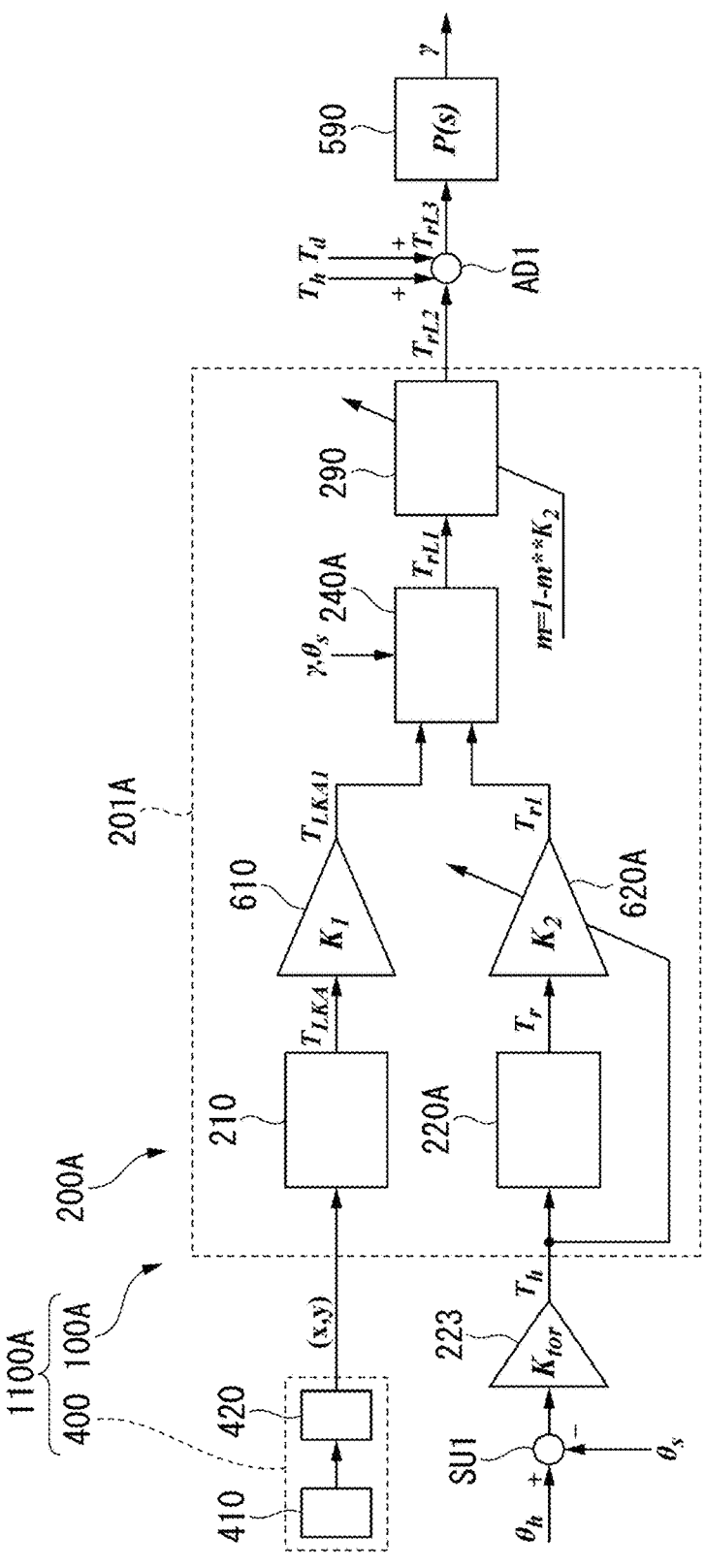
FIG. 19 is a block diagram illustrating a configuration of the lane keeping system according to a second example embodiment of the present disclosure.

As illustrated in FIG. 19, a control device 100A of a lane keeping system 1100A of the present example embodiment is different from that of the first example embodiment in the configuration of a controller 201A of a processor 200A. In the present example embodiment, the steering torque $T_h$ output from the torque conversion unit 223 is input to a second assist controller 220A. The second assist controller 220A is similar to the second assist controller 220 of the first example embodiment except that an input value is the steering torque $T_h$ output from the torque conversion unit 223. The second command torque $T_r$ output from the second assist controller 220A is input to a second gain adjustment portion 620A. The second gain adjustment portion 620A is similar to the second gain adjustment portion 620 of the first example embodiment except that an input value is the second command torque $T_r$ output from the second assist controller 220A. The second gain adjustment portion 620A multiplies the second command torque $T_r$ by the second gain $K_2$ to obtain a second command torque Tri, and outputs the second command torque $T_{rL1}$ to a vehicle stabilization controller 240A.

In the present example embodiment, the first command torque $T_{LKA1}$ output from the first gain adjustment portion 610 is input only to the vehicle stabilization controller 240A. A command torque obtained by adding the first command torque $T_{LKA1}$ and the second command torque $T_{rL1}$ is input to the vehicle stabilization controller 240A. The other configurations of the vehicle stabilization controller 240A are similar to the other configurations of the vehicle stabilization controller 240 in the first example embodiment.

In the present example embodiment, the first command torque $T_{LKA1}$ that is a first input value and the second command torque $T_{rL1}$ that is a second input value are input to the vehicle stabilization controller 240A independently of each other. For this reason, output from the first assist controller 210 adjusted by the first gain $K_1$ and output from the second assist controller 220A adjusted by the second gain $K_2$ can be input to the vehicle stabilization controller 240A regardless of other output. By the above, it is easy to adjust each control amount by each assist controller.

Note that, in the present description, "a first input value and a second input value are input to a vehicle stabilization controller independently of each other" means that, for example, the first input value and the second input value input to the vehicle stabilization controller are calculated regardless of the other input value.

The other configurations of the control device 100A are similar to the other configurations of the control device 100 in the first example embodiment. The other configurations of the lane keeping system 1100A are similar to the other configurations of the lane keeping system 1100 in the first example embodiment.

Note that, in the present example embodiment, a first input value output from the first assist controller 210 may be an angle. In this case, the first input value may be input to the vehicle stabilization controller 240A as an angle, or may be input to the vehicle stabilization controller 240A after being converted into a torque. In a case where the first input value is input to the vehicle stabilization controller 240A as an angle, a second input value output from the second assist controller 220A and input to the vehicle stabilization controller 240A is also an angle.

Figure 20:
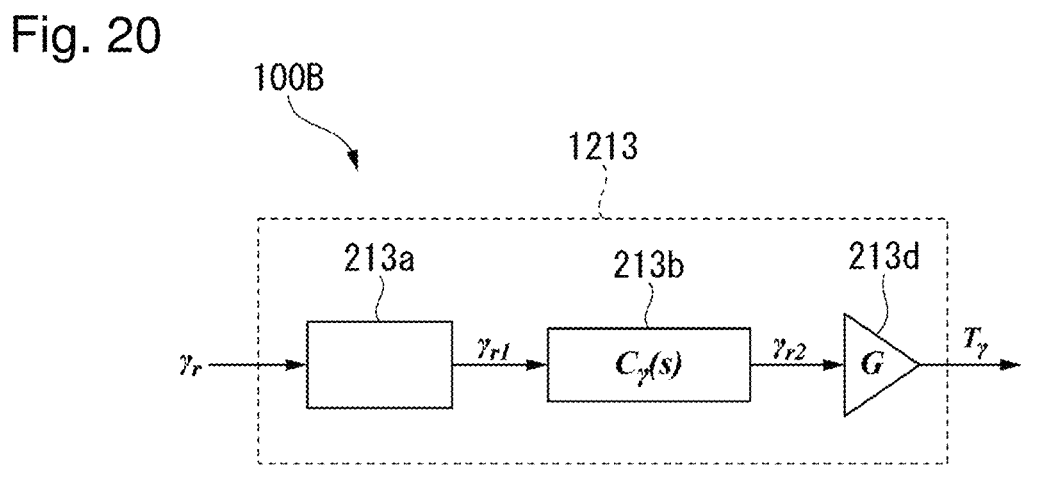

As illustrated in FIG. 20, in a control device 100B of the present example embodiment, a yaw rate controller 1213 does not include the yaw rate phase adjustment portion 213c unlike the yaw rate controller 213 in the first example embodiment. In the present example embodiment, the yaw rate target value $\gamma_{r2}$ output from the yaw rate adjustment portion 213b is input to the torque conversion unit 213d and converted into the yaw rate command torque $T_{\gamma}$. The other configurations of the yaw rate controller 1213 are similar to the other configurations of the yaw rate controller 213 in the first example embodiment.

In the present example embodiment, the transfer function $P_{nv}(s)$ of the second nominal model NM2 is expressed by, for example, Formula (25) below.

[Mathematical formula 25]

$$P_{nv}(s) = \frac{G_\theta^\gamma(0)}{\dfrac{1}{2\pi f_r}s + 1} \qquad (25)$$

where, s is a Laplace transformer, $f_r$ is a parameter desired as a parameter corresponding to the natural frequency $f_\gamma$ of the yaw rate $\gamma$, and $G_\theta^\gamma(0)$ is a stationary gain of a transfer function from the actual steering angle $\theta_t$ of the tires 529A and 529B of the vehicle V to the yaw rate $\gamma$. The transfer function $P_{nv}(s)$ of the second nominal model NM2 in the present example embodiment is similar to the transfer function $P_{nv}(s)$ of the second nominal model NM2 in the first example embodiment except that the parameter $f_n$ of the transfer function $P_{nv}(s)$ of the second nominal model NM2 in the first example embodiment is replaced with the parameter $f_r$.

In the present example embodiment, the second model following controller 241 performs model following control of restricting the transfer function $G_\theta^\gamma(s)$ of the second control target 580 to the second nominal model NM2 having the parameter $f_r$ desired as a parameter corresponding to the natural frequency $f_\gamma$ of the yaw rate $\gamma$, so that the natural frequency $f_\gamma$ of the yaw rate Y in the transfer function $G_\theta^\gamma(s)$ of the second control target 580 can be set to a desired value. That is, in the present example embodiment, the second model following controller 241 adjusts the natural frequency $f_\gamma$ of the yaw rate $\gamma$ in the transfer function $G_\theta^\gamma(s)$ of the second control target 580 that is a plant model by adjusting the parameter $f_r$ corresponding to the natural frequency $f_\gamma$ of the yaw rate $\gamma$ in the transfer function $P_{nv}(s)$ of the second nominal model NM2. By the above, traveling stability of the vehicle V can be further improved.

The other configurations of the control device 100B are similar to the other configurations of the control device 100 in the first example embodiment. Note that the configuration of the control device 100B of the present example embodiment is also applicable to the control device 100A of the second example embodiment.

The present disclosure is not limited to the above-described example embodiment, and other configurations and other methods can be employed within the scope of the technical idea of the present disclosure. The first frequency band is not particularly limited. The second frequency band is not particularly limited as long as it is a frequency band higher than the first frequency band. A transfer function of the yaw rate adjustment portion and a transfer function of the lateral displacement adjustment portion do not need to have a complementary relationship with each other. The variable parameter may be a parameter that changes in any manner as long as it changes based on the second gain. In a case where lane keeping control is executed, the variable parameter and the second gain do not need to have a complementary relationship with each other.

Note that the present technique can have a configuration as described below.

[1] A control device that controls a steering assembly mounted on a vehicle, the control device including a first assist controller that is capable of executing lane keeping control to keep the vehicle in a lane and generates a first input value, a second assist controller to generate a second input value based on a steering input value input from a steering wheel of the vehicle, a disturbance sensitivity controller to which a command value calculated based on the first input value multiplied by a first gain and the second input value multiplied by a second gain is input. The first gain and the second gain are variable values, when the first gain is set to $K_1$ and the second gain is set to $K_2$, $K_1 = 1 - K_2$ is satisfied, the disturbance sensitivity controller includes a first model following controller to generate a correction value to correct the command value based on output of a control target including a motor provided in the steering assembly and a first nominal model based on a configuration of the control target, the first model following controller is configured such that a transfer function of the control target is restricted to a transfer function of the first nominal model in a frequency band in which a complementary sensitivity gain, which is a gain in a gain characteristic of a complementary sensitivity function with respect to a modeling error between the control target and the first nominal model, is one or substantially one, and the complementary sensitivity function includes a variable parameter that changes based on the second gain.

[2] The control device according to [1], in which the first gain in a case where the first assist controller executes the lane keeping control is larger than the first gain in a case where the first assist controller does not execute the lane keeping control, and a stationary gain of the complementary sensitivity function in a case where the first assist controller executes the lane keeping control is larger than a stationary gain of the complementary sensitivity function in a case where the first assist controller does not execute the lane keeping control.

[3] The control device according to [1] or [2], in which as the variable parameter is larger, the stationary gain of the complementary sensitivity function becomes larger, and the variable parameter and the second gain have a complementary relationship with each other.

[4] The control device according to any one of [1] to [3], in which the steering assembly includes an input shaft to which a steering wheel steered by a steering person is connected, an output shaft connected to the input shaft via a torsion bar, and the motor connected to the output shaft, the second assist controller generates an assist torque to compensate for at least a part of a self-aligning torque generated in a tire of the vehicle based on an input torque calculated based on a torsion bar torque generated in the torsion bar, the second input value is calculated based on the assist torque, the variable parameter is a ratio of the correction value to disturbance input to the control target, and when a spring constant of the torsion bar is $K_{tor}$, an inclination of a self-aligning torque generated on a tire of the vehicle with respect to a steering angle that is a rotation angle of the output shaft is $K_{SAT}$, an inclination of the assist torque with respect to the input torque is $K_{ass}$, a stationary gain of the complementary sensitivity function is $T(0)$, and the variable parameter is m, the following formula is satisfied:

$$T(0) = \frac{K_{tor} + K_{ass} + mK_{SAT}}{K_{tor} + K_{ass} + K_{SAT}}$$

[5] The control device according to any one of [1] to [4], further including a vehicle stabilization controller to restrict a transfer function of a plant model having an actual steering angle of a tire of the vehicle as input and a yaw rate of the vehicle as output to a transfer function of a second nominal model by model following control, in which the vehicle stabilization controller includes a second model following controller to perform model following control, the second model following controller is configured such that the transfer function of the plant model is restricted to the transfer function of the second nominal model in a frequency band in which a gain in a gain characteristic of a complementary sensitivity function with respect to a modeling error between the plant model and the second nominal model is one or substantially one, and the first input value and the second input value are input to the vehicle stabilization controller independently of each other.

[6] The control device according to [5], in which the first assist controller includes a yaw rate controller to generate a yaw rate command value based on a yaw rate target value, the transfer function of the second nominal model includes a parameter corresponding to a natural frequency of the yaw rate, the yaw rate controller includes a yaw rate phase adjustment portion to adjust a phase of the yaw rate target value, and a transfer function of the yaw rate phase adjustment portion includes a transfer function by which the parameter corresponding to the natural frequency of the yaw rate in the transfer function of the second nominal model can be converted into a different value.

[7] The control device according to [5], in which the transfer function of the second nominal model includes a parameter corresponding to a natural frequency of the yaw rate, and the second model following controller adjusts the natural frequency of the yaw rate in the transfer function of the plant model by adjusting the parameter corresponding to the natural frequency of the yaw rate in the transfer function of the second nominal model.

[8] A control device according to any one of [1] to [5], in which the first assist controller includes a vehicle state calculator to calculate a yaw rate target value, which is a target value of a yaw rate of the vehicle, and lateral displacement of the vehicle based on input from an imaging device, a yaw rate controller to generate a yaw rate command value based on the yaw rate target value, and a lateral displacement controller to generate a lateral displacement command value based on the lateral displacement, the yaw rate controller includes a yaw rate adjustment portion to adjust the yaw rate command value according to a frequency, the lateral displacement controller includes a lateral displacement adjustment portion to adjust the lateral displacement command value according to a frequency, a gain of a transfer function of the yaw rate adjustment portion in a first frequency band is lower than a gain of the transfer function of the yaw rate adjustment portion in a second frequency band higher than the first frequency band, and a gain of a transfer function of the lateral displacement adjustment portion in the second frequency band is lower than a gain of the transfer function of the lateral displacement adjustment portion in the first frequency band.

[9] The control device according to [8], in which when the transfer function of the yaw rate adjustment portion is set to $C_\gamma(s)$, the transfer function of the lateral displacement adjustment portion is set to $C_y(s)$, and a constant that is one or substantially one is set to $K_{\gamma y}$, $C_\gamma(s) = K_{\gamma y} - C_y(s)$ is satisfied.

45

[10] An electric power steering device including the control device according to any one of [1] to [9], and the steering assembly.

[11] A control method of controlling a steering assembly mounted on a vehicle, the control method including executing lane keeping control for keeping the vehicle in a lane, generating a first input value by the lane keeping control, generating a second input value based on a steering input value input from a steering wheel of the vehicle, calculating a command value based on the first input value multiplied by a first gain and the second input value multiplied by a second gain, executing model following control to generate a correction value for correcting the command value based on output of a control target including a motor provided in the steering assembly and a first nominal model based on a configuration of the control target, and restricting a transfer function of the control target to a transfer function of the first nominal model in a frequency band in which a complementary sensitivity gain, which is a gain in a gain characteristic of a complementary sensitivity function with respect to a modeling error between the control target and the first nominal model, is one or substantially one by the model following control, in which the first gain and the second gain are variable values, when the first gain is set to $K_1$ and the second gain is set to $K_2$, $K_1=1-K_2$ is satisfied, and the complementary sensitivity function includes a variable parameter that changes based on the second gain.

The configurations and methods described above in the present description can be appropriately combined within a range consistent with each other.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device that controls a steering assembly mounted on a vehicle, the control device comprising:
   a first assist controller to execute lane keeping control to keep the vehicle in a lane and generate a first input value;
   a second assist controller to generate a second input value based on a steering input value input from a steering wheel of the vehicle; and
   a disturbance sensitivity controller to which a command value calculated based on the first input value multiplied by a first gain and the second input value multiplied by a second gain is input; wherein
   the first gain and the second gain are variable values;
   when the first gain is set to $K_1$ and the second gain is set to $K_2$, $K_1=1-K_2$ is satisfied;
   the disturbance sensitivity controller includes a first model following controller to generate a correction value to correct the command value based on output of a control target including a motor provided in the steering assembly and a first nominal model based on a configuration of the control target;
   the first model following controller is configured or programmed such that a transfer function of the control target is restricted to a transfer function of the first nominal model in a frequency band in which a complementary sensitivity gain, which is a gain in a gain characteristic of a complementary sensitivity function with respect to a modeling error between the control target and the first nominal model, is one or substantially one; and
the complementary sensitivity function includes a variable parameter that changes based on the second gain.

2. The control device according to claim 1, wherein
the first gain in a case where the first assist controller executes the lane keeping control is larger than the first gain in a case where the first assist controller does not execute the lane keeping control; and
a stationary gain of the complementary sensitivity function in a case where the first assist controller executes the lane keeping control is larger than a stationary gain of the complementary sensitivity function in a case where the first assist controller does not execute the lane keeping control.

3. The control device according to claim 1, wherein
as the variable parameter is larger, the stationary gain of the complementary sensitivity function becomes larger; and
the variable parameter and the second gain have a complementary relationship with each other.

4. The control device according to claim 1, wherein
the steering assembly includes an input shaft to which a steering wheel steered by a steering person is connected, an output shaft connected to the input shaft via a torsion bar, and the motor connected to the output shaft;
the second assist controller is configured or programmed to generate an assist torque that compensates for at least a portion of a self-aligning torque generated in a tire of the vehicle based on an input torque calculated based on a torsion bar torque generated in the torsion bar;
the second input value is calculated based on the assist torque;
the variable parameter is a ratio of the correction value to disturbance input to the control target; and
when a spring constant of the torsion bar is $K_{tor}$, an inclination of a self-aligning torque generated on a tire of the vehicle with respect to a steering angle that is a rotation angle of the output shaft is $K_{SAT}$, an inclination of the assist torque with respect to the input torque is $K_{ass}$, a stationary gain of the complementary sensitivity function is $T(0)$, and the variable parameter is m, the following formula is satisfied:

$$T(0) = \frac{K_{tor} + K_{ass} + mK_{SAT}}{K_{tor} + K_{ass} + K_{SAT}}.$$

5. The control device according to claim 1, further comprising:
a vehicle stabilization controller to restrict a transfer function of a plant model having an actual steering angle of a tire of the vehicle as input and a yaw rate of the vehicle as output to a transfer function of a second nominal model by model following control; wherein
the vehicle stabilization controller includes a second model following controller to perform model following control;
the second model following controller is configured or programmed such that the transfer function of the plant model is restricted to the transfer function of the second nominal model in a frequency band in which a gain in a gain characteristic of a complementary sensitivity function with respect to a modeling error between the plant model and the second nominal model is one or substantially one; and the first input value and the second input value are input to the vehicle stabilization controller independently of each other.

6. The control device according to claim 5, wherein the first assist controller includes a yaw rate controller to generate a yaw rate command value based on a yaw rate target value;

the transfer function of the second nominal model includes a parameter corresponding to a natural frequency of the yaw rate;

the yaw rate controller includes a yaw rate phase adjuster to adjust a phase of the yaw rate target value; and a transfer function of the yaw rate phase adjuster includes a transfer function by which the parameter corresponding to the natural frequency of the yaw rate in the transfer function of the second nominal model can be converted into a different value.

7. The control device according to claim 5, wherein the transfer function of the second nominal model includes a parameter corresponding to a natural frequency of the yaw rate; and the second model following controller is configured or programmed to adjust the natural frequency of the yaw rate in the transfer function of the plant model by adjusting the parameter corresponding to the natural frequency of the yaw rate in the transfer function of the second nominal model.

8. The control device according to claim 1, wherein the first assist controller includes:

a vehicle state calculator to calculate a yaw rate target value, which is a target value of a yaw rate of the vehicle, and lateral displacement of the vehicle based on input from an imaging device;

a yaw rate controller to generate a yaw rate command value based on the yaw rate target value; and a lateral displacement controller to generate a lateral displacement command value based on the lateral displacement;

the yaw rate controller includes a yaw rate adjuster to adjust the yaw rate command value according to a frequency;

the lateral displacement controller includes a lateral displacement adjuster to adjust the lateral displacement command value according to a frequency;

a gain of a transfer function of the yaw rate adjuster in a first frequency band is lower than a gain of the transfer function of the yaw rate adjuster in a second frequency band higher than the first frequency band; and a gain of a transfer function of the lateral displacement adjuster in the second frequency band is lower than a gain of the transfer function of the lateral displacement adjuster in the first frequency band.

9. The control device according to claim 8, wherein when the transfer function of the yaw rate adjustment portion is set to $C_\gamma(s)$, the transfer function of the lateral displacement adjuster is set to $C_y(s)$, and a constant that is one or substantially one is set to $K_{\gamma y}$, $C_\gamma(S)=K_{\gamma y}-C_y(S)$ is satisfied.

10. An electric power steering device comprising:

the control device according to claim 1; and the steering assembly.

11. A control method of controlling a steering assembly mounted on a vehicle, the control method comprising:

executing lane keeping control to keep the vehicle in a lane;

generating a first input value by the lane keeping control;

generating a second input value based on a steering input value input from a steering wheel of the vehicle;

calculating a command value based on the first input value multiplied by a first gain and the second input value multiplied by a second gain;

executing model following control to generate a correction value to correct the command value based on output of a control target including a motor provided in the steering assembly and a first nominal model based on a configuration of the control target; and restricting a transfer function of the control target to a transfer function of the first nominal model in a frequency band in which a complementary sensitivity gain, which is a gain in a gain characteristic of a complementary sensitivity function with respect to a modeling error between the control target and the first nominal model, is one or substantially one by the model following control; wherein the first gain and the second gain are variable values;

when the first gain is set to $K_1$ and the second gain is set to $K_2$, $K_1=1-K_2$ is satisfied; and the complementary sensitivity function includes a variable parameter that changes based on the second gain.

* * * * *